(12) United States Patent
Zinder

(10) Patent No.: US 11,792,017 B2
(45) Date of Patent: **\*Oct. 17, 2023**

(54) SYSTEMS AND METHODS OF SECURE PROVENANCE FOR DISTRIBUTED TRANSACTION DATABASES

(71) Applicant: NASDAQ, INC., New York, NY (US)

(72) Inventor: Alex Zinder, New York, NY (US)

(73) Assignee: NASDAQ, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,210

(22) Filed: Nov. 14, 2022

(65) Prior Publication Data
US 2023/0072760 A1 Mar. 9, 2023

Related U.S. Application Data

(63) Continuation of application No. 16/818,774, filed on Mar. 13, 2020, now Pat. No. 11,522,716, which is a
(Continued)

(51) Int. Cl.
*H04L 29/00* (2006.01)
*H04L 9/32* (2006.01)
(Continued)

(52) U.S. Cl.
CPC .......... *H04L 9/3247* (2013.01); *G06F 16/219* (2019.01); *G06F 21/6254* (2013.01);
(Continued)

(58) Field of Classification Search
CPC ... H04L 9/3247; H04L 9/3239; H04L 63/123; H04L 9/50; H04L 2209/56; G06F 16/219; G06F 21/6254; G06F 2221/2101
See application file for complete search history.

(56) References Cited

U.S. PATENT DOCUMENTS

| 7,356,696 B1 | 4/2008 | Jakobsson et al. |
| 7,359,877 B2 | 4/2008 | Malitzis et al. |

(Continued)

FOREIGN PATENT DOCUMENTS

| JP | 2016/200954 | 12/2016 |
| WO | WO 00/26745 | 5/2000 |

(Continued)

OTHER PUBLICATIONS

Nakamoto, S., "Bitcoin: A Peer-to-Peer Electronic Cash System," www.bitcoin.org, Nov. 2008, 9 pages.
(Continued)

*Primary Examiner* — Ghazal B Shehni
(74) *Attorney, Agent, or Firm* — Nixon & Vanderhye P.C.

(57) ABSTRACT

An electronic resource tracking and storage computer system is provided that communicates with a distributed blockchain computing system that includes multiple computing nodes. The system includes a storage system, a transceiver, and a processing system. The storage system includes an resource repository and transaction repository that stores submitted blockchain transactions. A new resource issuance request is received, and a new resource is added to the resource repository in response. A new blockchain transaction is generated and published to the blockchain. In correspondence with publishing to the blockchain, the transaction storage is updated with information that makes up the blockchain transaction and some information that was not included as part of the blockchain transaction. The transaction storage is updated when the blockchain is determined to have validated the previously submitted blockchain transaction.

20 Claims, 19 Drawing Sheets

Related U.S. Application Data continuation of application No. 16/137,595, filed on Sep. 21, 2018, now Pat. No. 10,630,485, which is a continuation of application No. 15/200,756, filed on Jul. 1, 2016, now Pat. No. 10,097,356.

(60) Provisional application No. 62/270,560, filed on Dec. 21, 2015, provisional application No. 62/188,422, filed on Jul. 2, 2015.

(51) Int. Cl.
*H04L 9/40* (2022.01)
*G06F 16/21* (2019.01)
*G06F 21/62* (2013.01)
*H04L 9/00* (2022.01)

(52) U.S. Cl.
CPC .......... *H04L 9/3239* (2013.01); *H04L 63/123* (2013.01); *G06F 2221/2101* (2013.01); *H04L 9/50* (2022.05); *H04L 2209/56* (2013.01)

(56) References Cited

U.S. PATENT DOCUMENTS

| | | | |
|---|---|---|---|
| 7,487,123 | B1 | 2/2009 | Keiser et al. |
| 7,778,915 | B2 | 8/2010 | Angle et al. |
| 7,895,112 | B2 | 2/2011 | Richmann et al. |
| 7,921,051 | B2 | 4/2011 | Serkin et al. |
| 7,933,827 | B2 | 4/2011 | Richmann et al. |
| 7,974,907 | B2 | 7/2011 | Miller et al. |
| 8,132,005 | B2 | 3/2012 | Tarkkla et al. |
| 8,190,893 | B2 | 5/2012 | Benson et al. |
| 8,244,622 | B2 | 8/2012 | Hughes, Jr. et al. |
| 8,386,362 | B2 | 2/2013 | Failla et al. |
| 8,412,952 | B1 | 4/2013 | Ramzan et al. |
| 8,606,685 | B2 | 12/2013 | Keiser et al. |
| 9,298,806 | B1 | 3/2016 | Vessenes et al. |
| 2003/0009413 | A1 | 1/2003 | Furbush et al. |
| 2003/0225672 | A1 | 12/2003 | Hughes et al. |
| 2008/0140578 | A1 | 6/2008 | Felt et al. |
| 2010/0228674 | A1 | 9/2010 | Ogg et al. |
| 2010/0250447 | A1 | 9/2010 | Hughes |
| 2011/0231913 | A1 | 9/2011 | Feng et al. |
| 2013/0061049 | A1 | 3/2013 | Irvine |
| 2013/0238478 | A1 | 9/2013 | Bruno |
| 2013/0238903 | A1 | 9/2013 | Mizunama |
| 2013/0254052 | A1 | 9/2013 | Royyuru et al. |
| 2014/0280476 | A1 | 9/2014 | Chiussi et al. |
| 2014/0337206 | A1 | 11/2014 | Talker |
| 2014/0344015 | A1 | 11/2014 | Puertolas-Montanes et al. |
| 2015/0120567 | A1 | 4/2015 | Van Rooyen |
| 2015/0170112 | A1 | 6/2015 | Decastro |
| 2015/0227897 | A1 | 8/2015 | Loera |
| 2015/0244690 | A1 | 8/2015 | Mossbarger |
| 2015/0262137 | A1 | 9/2015 | Armstrong |
| 2015/0262173 | A1 | 9/2015 | Durbin et al. |
| 2015/0269557 | A1 | 9/2015 | Artman |
| 2015/0310424 | A1 | 10/2015 | Myers |
| 2015/0324787 | A1 | 11/2015 | Schaffner |
| 2015/0332283 | A1 | 11/2015 | Witchey |
| 2015/0356523 | A1 | 12/2015 | Madden |
| 2015/0356555 | A1 | 12/2015 | Pennanen |
| 2015/0363777 | A1 | 12/2015 | Ronca et al. |
| 2015/0363783 | A1 | 12/2015 | Ronca et al. |
| 2015/0371224 | A1* | 12/2015 | Lingappa ............. G06Q 20/401 705/71 |
| 2015/0379510 | A1 | 12/2015 | Smith |
| 2016/0012424 | A1 | 1/2016 | Simon et al. |
| 2016/0027229 | A1 | 1/2016 | Spanos et al. |
| 2016/0028552 | A1 | 1/2016 | Spanos et al. |
| 2016/0078219 | A1 | 3/2016 | Hernan |
| 2016/0080156 | A1 | 3/2016 | Kaliski, Jr. et al. |
| 2016/0112200 | A1 | 4/2016 | Kheterpal et al. |
| 2016/0125040 | A1 | 5/2016 | Kheterpal et al. |
| 2016/0261404 | A1 | 9/2016 | Ford |
| 2016/0342994 | A1* | 11/2016 | Davis ................. G06Q 20/0655 |
| 2017/0005804 | A1 | 1/2017 | Zinder |
| 2019/0028280 | A1 | 1/2019 | Zinder |
| 2020/0213132 | A1 | 7/2020 | Zinder |

FOREIGN PATENT DOCUMENTS

| | | |
|---|---|---|
| WO | WO 01/67409 | 9/2001 |
| WO | WO 01/86373 | 11/2001 |
| WO | WO 2008/127428 | 10/2008 |
| WO | WO 2015/059669 | 4/2015 |
| WO | WO 2015/085393 | 6/2015 |
| WO | WO 2015/113519 | 8/2015 |
| WO | 2015/171580 | 11/2015 |
| WO | WO 2015/179020 | 11/2015 |
| WO | WO 2016/008659 | 1/2016 |
| WO | WO 2016/022864 | 2/2016 |
| WO | WO 2016/029119 | 2/2016 |

OTHER PUBLICATIONS

"Digital Currency Exchange Goes Live to Public in Melbourne, Australia," AlphaPoint, <https://globenewswire.com/news-release/2015/12/10/794524/0/en/Digital-Currency-Exchange-Goes-Live-to-Public-in-Melbourne-Australia.html>, Dec. 10, 2015, 3 pages.

"Nasdaq Linq Enables First-Ever Private Securities Issuance Documented with Blockchain Technology," Nasdaq, <https://globenewswire.com/news-release/2015/12/30/798660/0/en/Nasdaq-Linq-Enables-First-Ever-Private-Securities-Issuance-Documented-With-Blockchain-Technology.html>, Dec. 30, 2015, 3 pages.

"Nasdaq Linq Enables First-Ever Private Securities Issuance Documented with Blockchain Technology," Nasdaq, <http://ir.nasdaq.com.releasedetail.cfm?ReleaseID=948326>, Dec. 30, 2015, 5 pages.

"Nasdaq Announces Inaugural Clients for Initial Blockchain-Enabled Platform 'Nasdaq Linq'," Nasdaq, <https://globenewswire.com/news-release/2015/10/27/780452/10154158/en/Nasdaq-Announces-Inaugural-Clients-for-Initial-Blockchain-Enabled-Platform-Nasdaq-Linq.html>, Oct. 27, 2015, 5 pages.

"Overstock.com Announces Historic Blockchain Public Offering," Overstock.com to .com, <https://globenewswire.com/news-release/2016/03/16/820477/0/en/Overstock-com-Announces-Historic-Blockchain-Public-Offering.html>, Mar. 16, 2016, 3 pages.

"Nasdaq's Blockchain Technology to Transform the Republic of Estonia's e-Residency Shareholder Particiaption," Nasdaq, <https://globenewswire.com/news-release/2016/02/12/810223/0/en/Nasdaq-s-blockchain-technology-to-transform-the-Republic-of-Estonia-s-e-Residency-shareholder-participation.html>, Feb. 12, 2016, 4 pages.

"Nasdaq and Chain to Partner on Blockchain Technology Initiative," Nasdaq, <https://globenewswire.com/news-release/2015/06/24/747144/10139529/en/Nasdaq-and-Chain-to-Partner-on-Blockchain-Technology-Initiative.html>, Jun. 24, 2015, 3 pages.

"Blockchain Technologies Corp Makes History, 2016 Iowa Caucus Results Forever Documented on Blockchain," <https://globenewswire.com/news-release/2016/02/06/808320/10159855/en/Blockchain-Technologies-Corp-Makes-History-2016-Iowa-Caucus-Results-Forever-Documented-on-Blockchain.html>, Feb. 5, 2016, 2 pages.

"AlphaPoint Announces Blockchain Solution Custom-Built for Financial Institutions," AlphaPoint, <https://globenewswire.com/news-release/2015/10/26/779929/0/en/AlphaPoint-Announces-Blockchain-Solution-Custom-Built-for-Financial-Institutions.html>, Oct. 26, 2015, 3 pages.

"Nasdaq Launches Enterprise-Wide Blockchain Technology Initiative," Nasdaq, <https://globenewswire.com/news-release/2015/05/11/734456/10133665/en/Nasdaq-Launches-Enterprise-Wide-Blockchain-Technology-Initiative.html>, May 11, 2015, 3 pages.

"RR Donnelley to Pursue New Blockchain-Enabled Capabilities for Publishing Industry," <https://globenewswire.com/news-release/2016/03/14/819355/0/en/RR-Donnelley-to-Pursue-New-Blockchain-Enabled-Capabilities-for-Publishing-Industry.html>, Mar. 14, 2016, 3 pages.

International Search Report and Written Opinion issued in Application No. PCT/US16/25189 dated Jul. 1, 2016 (15 pp.).

(56) References Cited

OTHER PUBLICATIONS

International Search Report and Written Opinion issued in Application No. PCT/US16/040711 dated Oct. 4, 2016 (14 pages).
Notification of Transmittal of International Preliminary Report on Patentability in Application No. PCT/US16/040711 dated Jun. 26, 2017 (35 Pages).
Non-Final Office Action issued in U.S. Appl. No. 15/086,801 dated Jun. 29, 2018, (14 pages).
European Search Report in Application No. 16774168.5 dated Jul. 23, 2018 (14 pages).
Protocol Specification <https://web.archive.org/web/20150317044558/http://counterparty.io/docs/protocol_specification> Jul. 5, 2018 (9 pages).
Antonopoulos, Andreas M., Mastering Bitcoin—Unlocking Digital Cryptocurrencies, O'Reilly Media, Inc. 2015 (297 pages).
Non-Final Office Action issued in U.S. Appl. No. 15/086,801 dated Oct. 7, 2016, (26 pages).
Non-Final Office Action issued in U.S. Appl. No. 15/086,801 dated Feb. 10, 2017, (21 pages).
Japanese Office Action for Japanese Application No. 2017-568054, eight pages, dated Aug. 30, 2019.
Final Office Action issued in U.S. Appl. No. 15/086,801 dated Mar. 15, 2019, (13 pages).

\* cited by examiner

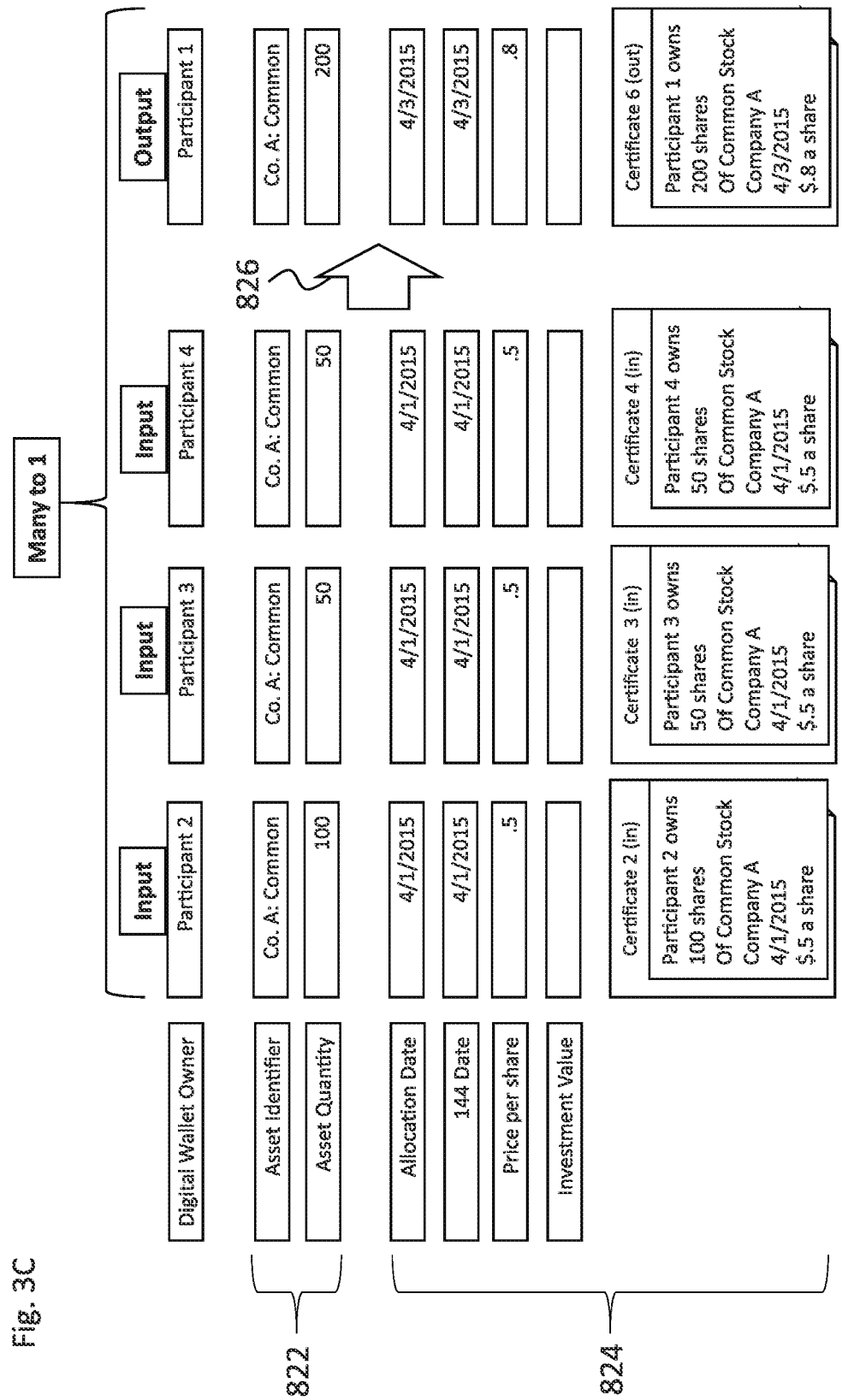

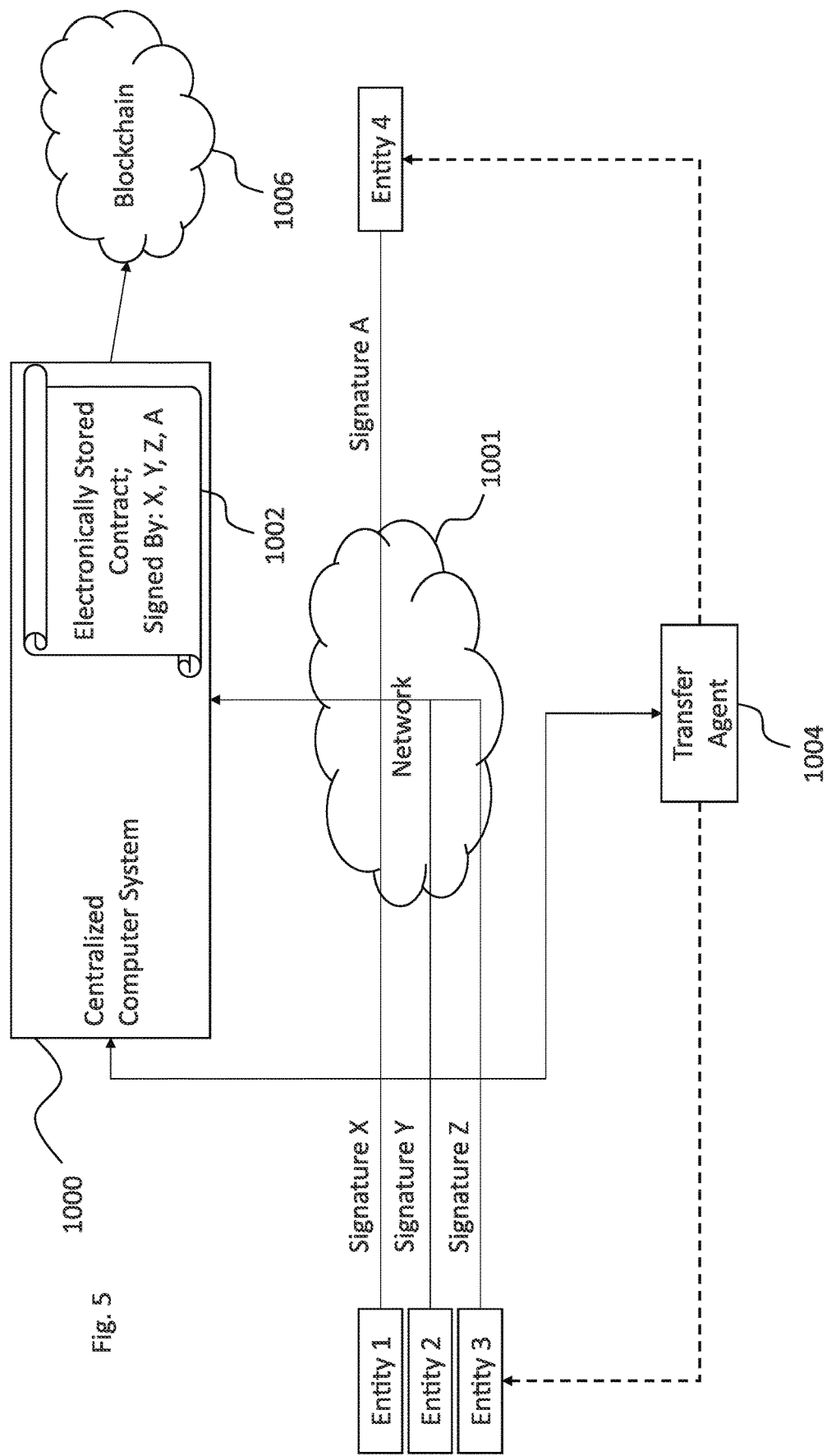

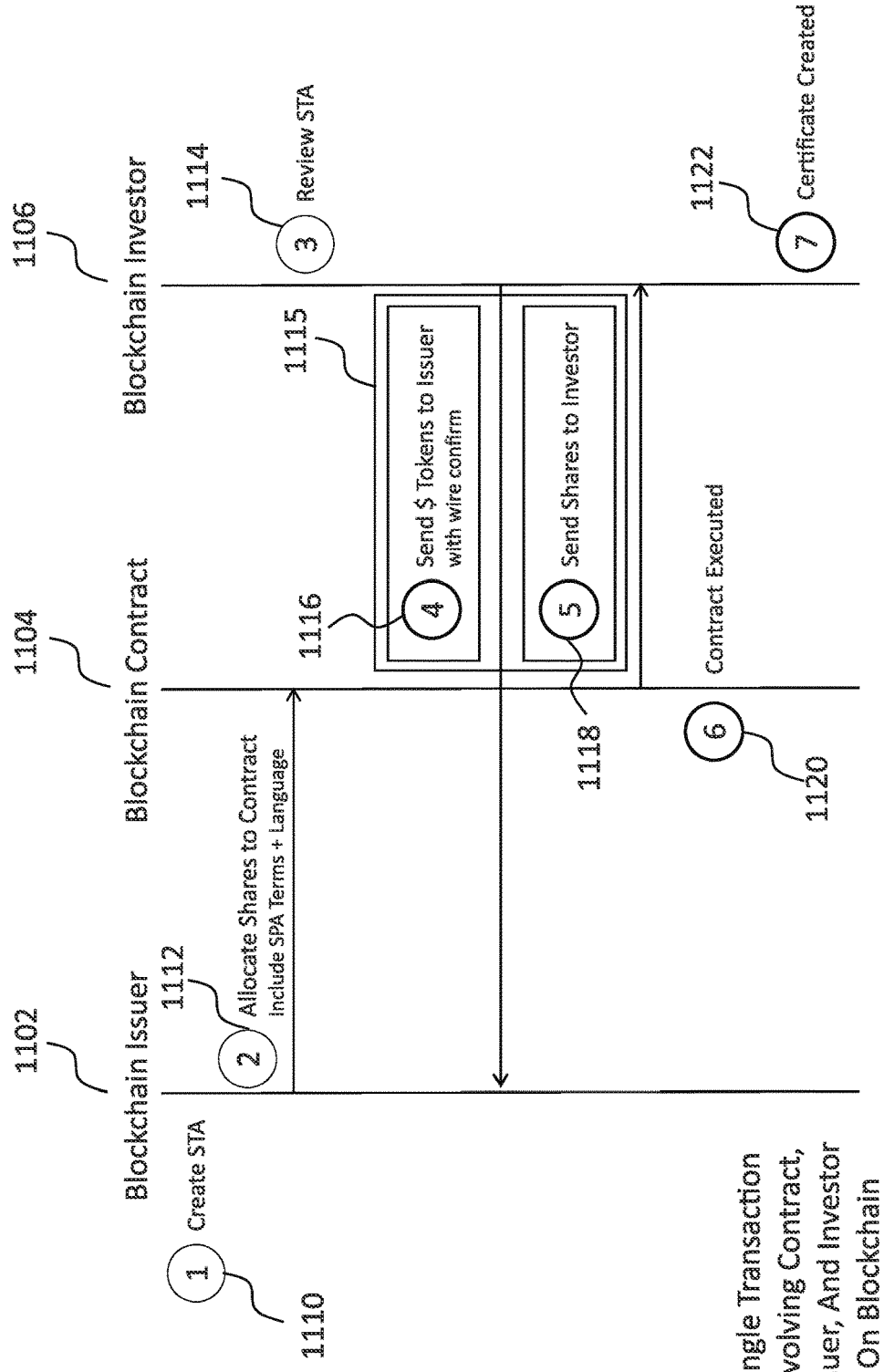

Key Financing Events

| ROUND | ISSUED | ALLOCATED | UN-ALLOCATED | SHARE PRICE |
|---|---|---|---|---|
| SEED | 9,716,729 | 4,719,465 | 4,997,264 | $0.0001 |
| SERIES A | 8,611,984 | 2,018,267 | 1,598,717 | $1.5555 |
| SERIES B | 5,889,714 | 3,827,840 | 2,061,874 | $11.75 |

SEED
SERIES A
SERIES B

FIG. 7A

Quark Inc., 2016 Q1 Series B

MATCHED BUY TOTAL $18,068,597.75 | CLEARING PRICE $11.75

(EXECUTE AUCTION)

| TOTAL SHARES TO BUY | TOTAL SHARES TO SELL | TOTAL SHARES MATCHED | TOTAL SHARES UNMATCHED | IMBALANCE SIDE | IMBALANCE SHARES |
|---|---|---|---|---|---|
| 1,750,000 | 1,537,753 | 1,537,753 | 212,247 | Buy | 212,247 |

Buyers
3 BUYING 1,750,000 SHARES

| ORDER | DATE | PARTICIPANT | ORDER SIZE | PRICE | MATCH SIZE | SPECIAL |
|---|---|---|---|---|---|---|
| 336 | 2016-8-4 | GRAMMER BIO-MEDICAL GROUP | 900,000 | $15.00 | 900000 | |
| 333 | 2016-8-4 | CALTEGRIS FUTURES INC | 300,000 | $14.00 | 300000 | |
| 337 | 2016-8-4 | BLACKGEM INC | 550,000 | $13.00 | 887758 | |

Sellers
13 SELLING 1,537,753 SHARES

| ORDER | DATE | PARTICIPANT | ORDER SIZE | PRICE | MATCH SIZE | SPECIAL |
|---|---|---|---|---|---|---|
| 328 | 2016-8-4 | VIC FONTAINE | 17,504 | $9.00 | 17504 | |
| 329 | 2016-8-4 | WINN ADAMI | 22,011 | $9.00 | 22011 | |
| 330 | 2016-8-4 | WILLIAM ROSS | 17,560 | $9.00 | 17560 | |
| 331 | 2016-8-4 | ODO | 5,220 | $9.00 | 5220 | |
| 332 | 2016-8-4 | BRUNT | 43,832 | $9.00 | 43322 | |
| 339 | 2016-8-4 | EZRI DAX | 17,268 | $9.00 | 17263 | |
| 333 | 2016-8-4 | ISHKA | 7,081 | $10.00 | 7031 | |
| 334 | 2016-8-4 | WORF, SON OF MOGH | 48,255 | $10.00 | 43255 | |
| 335 | 2016-8-4 | JADZIA DAX | 14,577 | $10.00 | 14577 | |
| 324 | 2016-8-4 | DUKAT | 500,000 | $10.50 | 500000 | |
| 325 | 2016-8-4 | WEYOUN | 150,000 | $10.50 | 150000 | |

SEED　SERIES A　SERIES B

FIG. 7C

Leeta
*Investor*

466.6k *Shares*

1 *Certificates*

| | VOID LEETA | | LEETA |
|---|---|---|---|
| | 500,000 SEED | | 466,667 SEED |
| | *Common Class* | | *Common Class* |
| | 2/20/13 | | 10/31/13 |

| CLASS | | SHARES | PRICE | AMT. INVESTED |
|---|---|---|---|---|
| CO | COMMON CLASS | 466,667 | $0.000001 | $0.47 |
| TOTAL | | 466,667 | | $0.47 |

FIG. 7F

SEED   SERIES A   SERIES B

FIG. 7G

Certificate #2085

*466,667 shares of Common Class issued on October 31st, 2013 to Leeta.*

NASDAQ VERIFIED CERTIFICATE I TRANSACTION ID 29D042CF06142AD711AF3C0532E66863C9493055AC8C4CE290D813E1D1AB5252

THIS CERTIFIES THAT

Leeta

IS THE OWNER OF

466,667

*Fully paid and non-assessable shares of the Common Class stock of Quark Inc.*

PRICE PER SHARE

$0.0001

INVESTMENT AMOUNT

$46.67

THESE SECURITIES HAVE NOT BEEN REGISTERED UNDER THE SECURITIES ACT OF 1933, AS AMENDED. THEY MAY NOT BE SOLD, OFFERED FOR SALE, PLEDGED OR HYPOTHECATED IN THE ABSENCE OF A REGISTRATION STATEMENT IN EFFECT WITH RESPECT TO THE SECURITIES UNDER SUCH ACT OR AN OPINION OF COUNSEL SATISFACTORY TO THE COMPANY THAT SUCH REGISTRATION IS NOT REQUIRED OR UNLESS SOLD PURSUANT TO RULE 144 OF SUCH ACT.
THE SECURITIES REPRESENTED BY THIS CERTIFICATE ARE SUBJECT TO A LOCK-UP PERIOD AFTER THE EFFECTIVE DATE OF THE ISSUER'S REGISTRATION STATEMENT FILED UNDER THE SECURITIES ACT OF 1933, AS AMENDED, AS SET FORTH IN AN AGREEMENT BETWEEN THE COMPANY AND THE ORIGINAL HOLDER OF THESE SECURITIES, A COPY OF WHICH MAY BE OBTAINED AT THE ISSURE'S PRINCIPAL OFFICE. SUCH LOCK-UP PERIOD IS BINDING ON TRANSFEREES OF THESE SHARES.
THE SHARES EVIDENCED HEREBY ARE SUBJECT TO A VOTING AGREEMENT (A COPY OF WHICH MAY BE OBTAINED UPON WRITTEN REQUEST FROM THE ISSUER), AND BY ACCEPTING ANY INTEREST IN SUCH SHARES THE PERSON ACCEPTING SUCH INTEREST SHALL BE DEEMED TO AGREE TO AND SHALL BECOME BOUND BY ALL THE PROVISIONS OF SAID VOTING AGREEMENT.
THE COMPANY IS AUTHORIZED TO ISSUE MORE THAN ON CLASS OR SERIES OF

FIG. 7H

Pending Certificate

*1 shares of Common Class issued on March 4th, 2016 to Leeta.*

All contract are signed.   AUTHORIZE PAYMENT.

LEGEND   (FIRST REFUSAL & CO-SALE)  (INVESTOR RIGHTS)  (PURCHASE AGREEMENT)  (VOTING AGREEMENT)

THIS CERTIFIES THAT
Leeta

IS THE OWNER OF
466,667

*Fully paid and non-assessable shares of the Common Class stock of Quark Inc.*

PRICE PER SHARE
$0.01

SECOND AMENDED AND RESTATED FIRST REFUSAL AND CO-SALE AGREEMENT

This SECOND AMENDED AND RESTATED FIRST REFUSAL AND CO-SALE AGREEMENT (the "Agreement") is entered into as of the 1st day of July, 2016 by and among QUARK, INC., a Delaware corporation (the "Company"), the holders of Common Stock of the Company (the "Common Stock") listed on Exhibit A attached hereto (the "Common Holders") and the holders of Series a Preferred Stock, Series B Preferred Stock, Series C Preferred Stock and Series C-1 Preferred Stock of the Company (collectively, the "Preferred Stock") listed on Exhibit B attached hereto (the "Investors").

WITNESSETH:

WHEREAS, the Company and certain of the Investors (the "Series C Investors") are parties to that certain Series C and Series C-1 Preferred Stock Purchase Agreement of even date herewith (the "Series C Agreement"), pursuant to which the Series C Investors are purchasing shares of the Company's Series C Preferred Stock and Series C-1 Preferred Stock;

WHEREAS, each Common Holder is the beneficial owner of the number of shares of Common Stock set forth opposite his name on Exhibit A attached hereto;

WHEREAS, the Company, the Common Holders and certain of the Investors (the "Existing Investors") are parties to that certain Amended and Restated First Refusal and Co-Sale Agreement, dated as of July 1, 2015 (the "Prior Agreement"); and

SYSTEMS AND METHODS OF SECURE PROVENANCE FOR DISTRIBUTED TRANSACTION DATABASES

CROSS REFERENCE(S) TO RELATED APPLICATION(S)

This application is a continuation of U.S. patent application Ser. No. 16/818,774, filed Mar. 13, 2020, now allowed; which is a continuation of U.S. patent application Ser. No. 16/137,595, filed Sep. 21, 2018, now U.S. Pat. No. 10,630,485, issued Apr. 21, 2020; which is a continuation of U.S. patent application Ser. No. 15/200,756, filed Jul. 1, 2016, now U.S. Pat. No. 10,097,356 issued Oct. 9, 2018; which claims benefit of U.S. Patent Application Nos. 62/188,422, filed Jul. 2, 2015, and 62/270,560, filed Dec. 21, 2015, the entire contents of each of which are incorporated herein by reference.

TECHNICAL OVERVIEW

The technology herein relates to distributed transaction database computer systems. More particularly, the technology herein relates to secure provenance in such systems.

INTRODUCTION

Digital provenance is a discipline of computer science and generally relates to the history of digital data stored on a computer system. Electronic data is easily modifiable (e.g., by simply changing an 1 to a 0) and there are no inherent mechanisms for providing provenance in such an environment. In other words, once an electronic record (e.g., such as a medical record) is changed, the previous information is overwritten with no inherent ability to undo or interrogate the history of that data. Accordingly, someone interested in the provenance of the digital data may only see the most recent version of the data, but may not be able to determine what created (or modified) the data, who or what is the responsible entity for the data, or where/when such creations of modifications occurred.

One way to address these shortcomings when digital data is stored is to use, for example, log files that record the changes to the digital data (e.g., a transaction log of a transactional database). However, in traditional implementations there is no guarantee that the log files themselves have not been manipulated. This lack of an authentic guarantee can be problematic in certain instances where the chain of provenance information is, perhaps, as valuable as the information itself. Consider a log file that includes a record that Alice accessed confidential information. This information may be valuable, but only if the log information being viewed is not easily modifiable such that the provenance chain is easily changeable after the fact.

Another issue in digital provenance is ensuring the availability of the provenance information. This is particularly important in the context of computer science applications and digital data as it is relatively easy to erase digital information without leaving much (if any) trace of the original contents of the data (e.g., by deleting a log file or the like). Thus, it will be appreciated that there is a technical need to facilitate increased access to certain types of data (such as provenance information).

Another aspect of provenance is that often times a particular scenario or application may require that the provenance information or the digital data associated with the provenance information be confidential. As an example, it may be desirable to show that the changes to a data record or the like where authorized, but not reveal which users authorized the changed. In another example, it may be desirable to hide the true owner (or past owners) of particular data file. However, at the same time, the provenance chain may still be used for verify the authenticity of a file or data field (e.g., that it has not been tampered with or the changes were authorized). In other words, the provenance chain may provide information to a third party that details the provenance without relating the exact identity of the past (or current) owners or users associated with the data. Thus, it will be appreciated that there is a technical need to allow entities to verify provenance and/or chain of custody without requiring all the past details of that information be available.

These and other problems persist in the discipline of computer science and digital data storage. Accordingly, there exists needs in the art to further develop techniques of providing secure provenance—particularly in the context of digital data storage and/or distributed database computer systems.

SUMMARY

One or more of the above problems is solved in certain example embodiments by an electronic resource tracking and storage computer system (computer system). The computer system is adapted or configured to communicate with distributed blockchain computing system that includes multiple computing nodes and a blockchain. The computer system includes storage for blockchain participant identifiers, blockchain resource identifiers, and records that correspond to blockchain transactions. A transceiver is configured to receive electronic data messages (including a first electronic data message) that includes a digital resource issuance request that is a request to issue a new amount of the resource. When a new request is received, the computer system is programmed to generate a blockchain transaction from a blockchain resource identifier (e.g., a blockchain address) to at least one participant identifier (e.g., another blockchain address). The generated transaction also includes a quantity value for this new resource that is to be issued or transferred. The generated blockchain transaction is digitally signed with at least one private key that is associated with the a blockchain resource identifier. The blockchain transaction is then sent to the blockchain for validation thereon. The computer system stores other information that is not part of the blockchain transaction into a database or the like. Once the blockchain transaction has been validated by the blockchain, the database is updated to reflect that the blockchain transaction is now part of the blockchain and thus (for practical purposes) immutable.

Accordingly, secure digital provenance is provided for the information that is contained in the blockchain transaction because of the cryptographic immutability of the records contained in blockchain. Other information (e.g., that may be confidential in nature) is stored outside of the blockchain thus securing information that is related to the blockchain transaction that is on the blockchain. Third-parties may be allowed to validate (e.g., audit) the transaction information by reviewing the blockchain transactions. This can be accomplished without reviewing the supplementary information that is not stored as part of the blockchain. The availability of the records on the blockchain is also increased because of the distributed nature of the distributed blockchain computing system. Thus, the failure of one node (or the destruction of records in one location) will not result in loss of the digital provenance information.

In certain example embodiments, plural different participant identifiers are included as separate outputs for a generated blockchain transaction. Each one of the identifiers is associated with a different participant. This allows multiple transactions (e.g., A→B and A-C) to be recorded in the same blockchain transaction.

In certain example embodiments, a first process (e.g., an auction process) is started, during which participants submit data transaction requests to send or receive amounts of the resource that is associated with the new digital resource identifier. The first process is closed to reception of data transaction requests from the participants. After the first process is closed, a single blockchain transaction that includes inputs that correspond to source participant identifiers and outputs that correspond to destination participant identifiers is generated. The single blockchain transaction is published to the distributed blockchain computing system for validation thereby. Accordingly, an auction process that involves many different transactions may be represented on the blockchain as one single blockchain transaction.

In certain example embodiments, wherein the outputs to the single blockchain transaction also include source participant identifiers for unspent amounts of the resource. Accordingly, those source identifier that are transferring some, but not all, of the resource "held" by them will receive a remainder.

In certain example embodiments, the generated blockchain transaction includes a hash value of the additional transaction data. Accordingly, the provenance information that is stored outside of the blockchain (e.g., in a separate database) may be represented on the blockchain without including it on the blockchain. This allows the digital provenance of the additional information to be secured because the hash value of that information will become part of the immutable blockchain record.

In certain example embodiments, a blockchain transaction (including issuance or allocation transactions) is digitally signed by two or more private keys. In certain example embodiments, one of the private keys is held or maintained by the electronic resource tracking and storage computer system.

In certain example embodiments, a resource allocation request is received for allocation of at least some of the quantity value associated with the previously generated blockchain transaction to another participant identifier. A second blockchain transaction is generated using, as an input, output data from a previously generated blockchain transaction. The output of the second blockchain transaction includes the value of at least some of the quantity value that is to be allocated to the another participant identifier. The generated second blockchain transaction is published to the blockchain and a transaction repository of the electronic resource tracking and storage computer system is updated with a record for the second blockchain transaction. The record includes additional transaction data that was not included in the second generated blockchain transaction. Accordingly, allocation of resources (such as private assets) is recorded to the blockchain. Further, chain of custody is ensured from the initial issuance to this further allocation as an auditor or other third party will be able to verify that the amount of resources (assets) associated with the transaction originated from the initial issuance.

In certain example embodiments, the blockchain is maintained on a private computer system such that only those users or computers that are authorized to interact with the blockchain may perform blockchain functionality (this includes the electronic resource tracking and storage computer system and blockchain nodes that are controlled by a single entity). In certain instances, third parties may be provided with read-only access to the blockchain. This may advantageously allow third parties to directly access the secure digital provenance information that is stored as part of the blockchain.

Certain example embodiments also relate to a method for operating an electronic resource tracking and storage computer system as described above, as well as computer program instructions that are embodied on a non-transitory storage medium.

The features described herein may be combined to form additional embodiments and sub-elements of certain embodiments may form yet further embodiments. This summary is provided to introduce a selection of concepts that are further described below in the detailed description. This summary is intended neither to identify key features or essential features of the claimed subject matter, nor to be used to limit the scope of the claimed subject matter; rather, this summary is intended to provide an overview of the subject matter described in this document. Accordingly, it will be appreciated that the above-described features are merely examples, and that other features, aspects, and advantages of the subject matter described herein will become apparent from the following detailed description, figures, and claims.

BRIEF DESCRIPTION OF THE DRAWINGS

These and other features and advantages will be better and more completely understood by referring to the following detailed description of example non-limiting illustrative embodiments in conjunction with the drawings of which:

FIGS. 3B and 3C show example transactions that occur in relation to transferring digital assets between participants according to certain example embodiments;

FIG. 5 is a non-limiting example function block diagram of a centralized computer system that interfaces with a blockchain according to certain example embodiments;

FIG. 6 is signaling diagram for an example blockchain transaction performed between an issuer on the blockchain, a contract on the blockchain, and an investor on the blockchain;

FIGS. 7A-7H are example screen shots of user interfaces that show how blockchain transactions and their associated data may be displayed for consumption by a user according to certain example embodiments.

DETAILED DESCRIPTION

Figure 1:
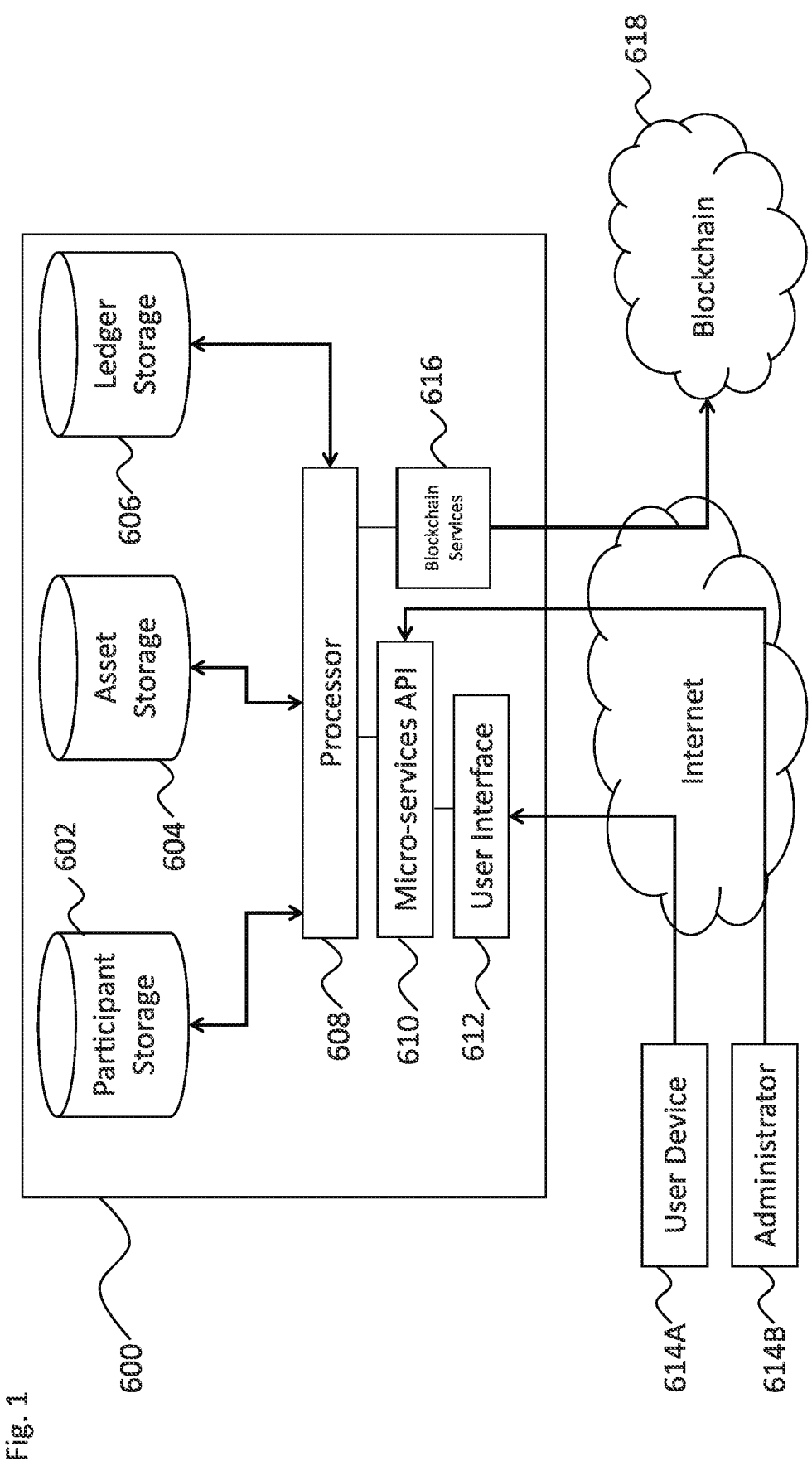
FIG. 1 illustrates a non-limiting example function block diagram of a digital asset repository computer system that interfaces with a blockchain according to certain example embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

In certain example embodiments, a computer system interfaces with a blockchain and provides secure provenance and chain-of-custody information for transactions that are recorded thereon. The computer system stores additional information related to transactions incorporated to the blockchain and also tracks whether or not the blockchain transaction has been validated.

Blockchain technology (sometimes simply referred to as a blockchain) is a relatively new type of database technology. An example implementation and corresponding blockchain techniques are described in a 2008 article by Satoshi Nakamoto titled "Bitcoin: A Peer-to-Peer Electronic Cash System," the entire contents of which are hereby incorporated by reference. A blockchain is a distributed database system (sometimes called a public ledger) that records transactions between a source identifier and a destination identifier. These identifiers are created through cryptography such as, for example, public key cryptography. For example, a user may create a destination identifier based on a private key. The relationship between the private key and the destination identifier provides a "proof" that the user is associated with the "output" from a corresponding "transaction." The decentralized nature of the block chain can also be advantageous because no one node or system is the effective holder of what is "correct." Instead, the decentralized system as a whole determines what is "correct" using mathematical techniques.

In certain example embodiments, a computer system is configured to communicate with a distributed blockchain computing system that includes multiple computing nodes. In certain example embodiments, the computer system and the blockchain act as a private certificate depository. The computer system stores (1) identifiers and/or private key information for participants of the computer system, (2) digital asset identifiers that are used to represent assets on the blockchain, and (3) blockchain transaction records. When a new blockchain transaction is submitted to the distributed blockchain computing system, the computer system waits to determine that the submitted new blockchain transaction has been validated. Once the new blockchain transaction has been validated, then the computer system updates a record of that blockchain transaction that is stored with the computer system. The record that is stored with the computer system includes information that is not included or part of the blockchain transaction that is validated by the distributed blockchain computing system.

Figure 2A:
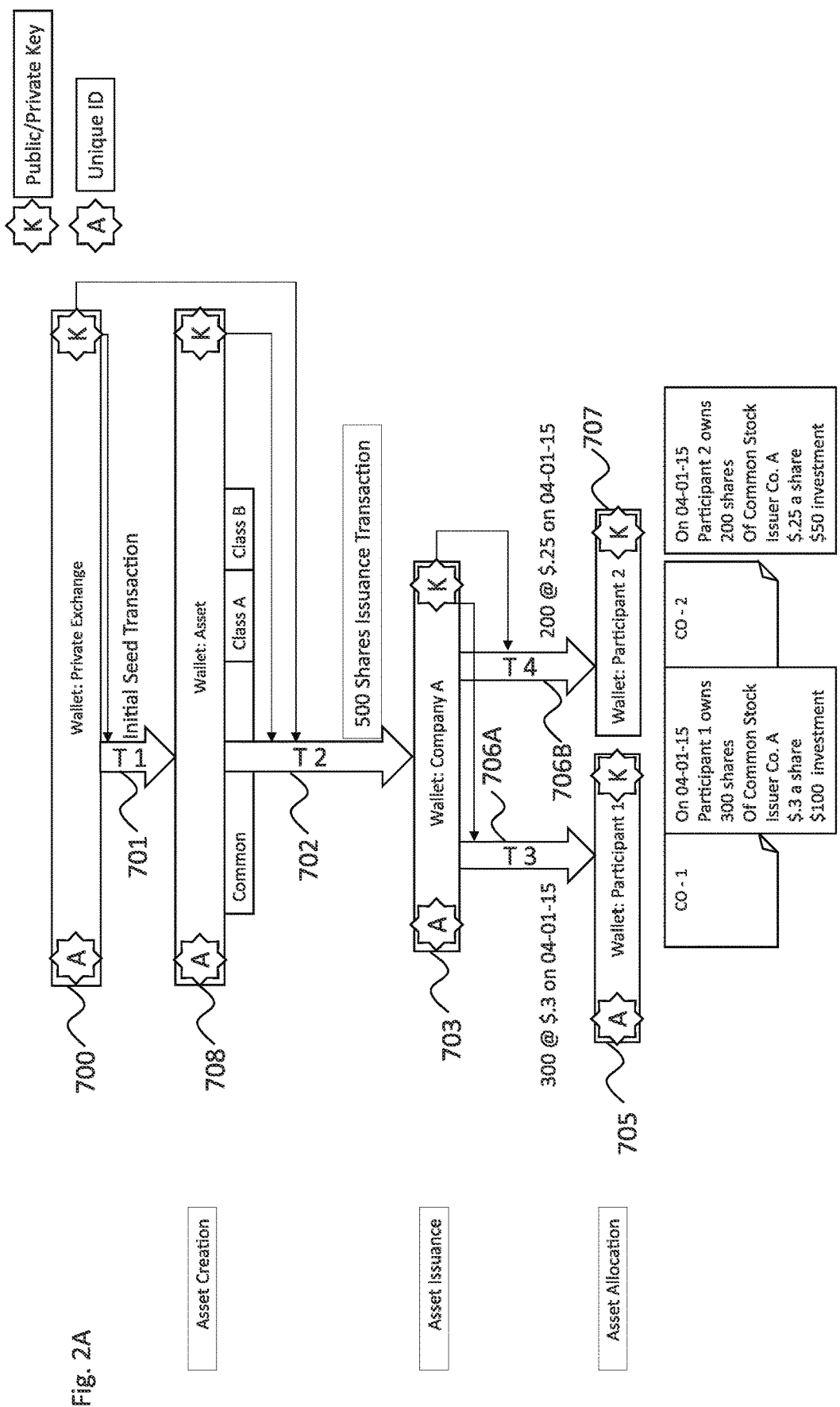
FIG. 2A illustrates example digital transactions that occur in a digital asset repository computer system to issue assets in a digital form that is recorded on a blockchain according to certain example embodiments.
Figure 2B:
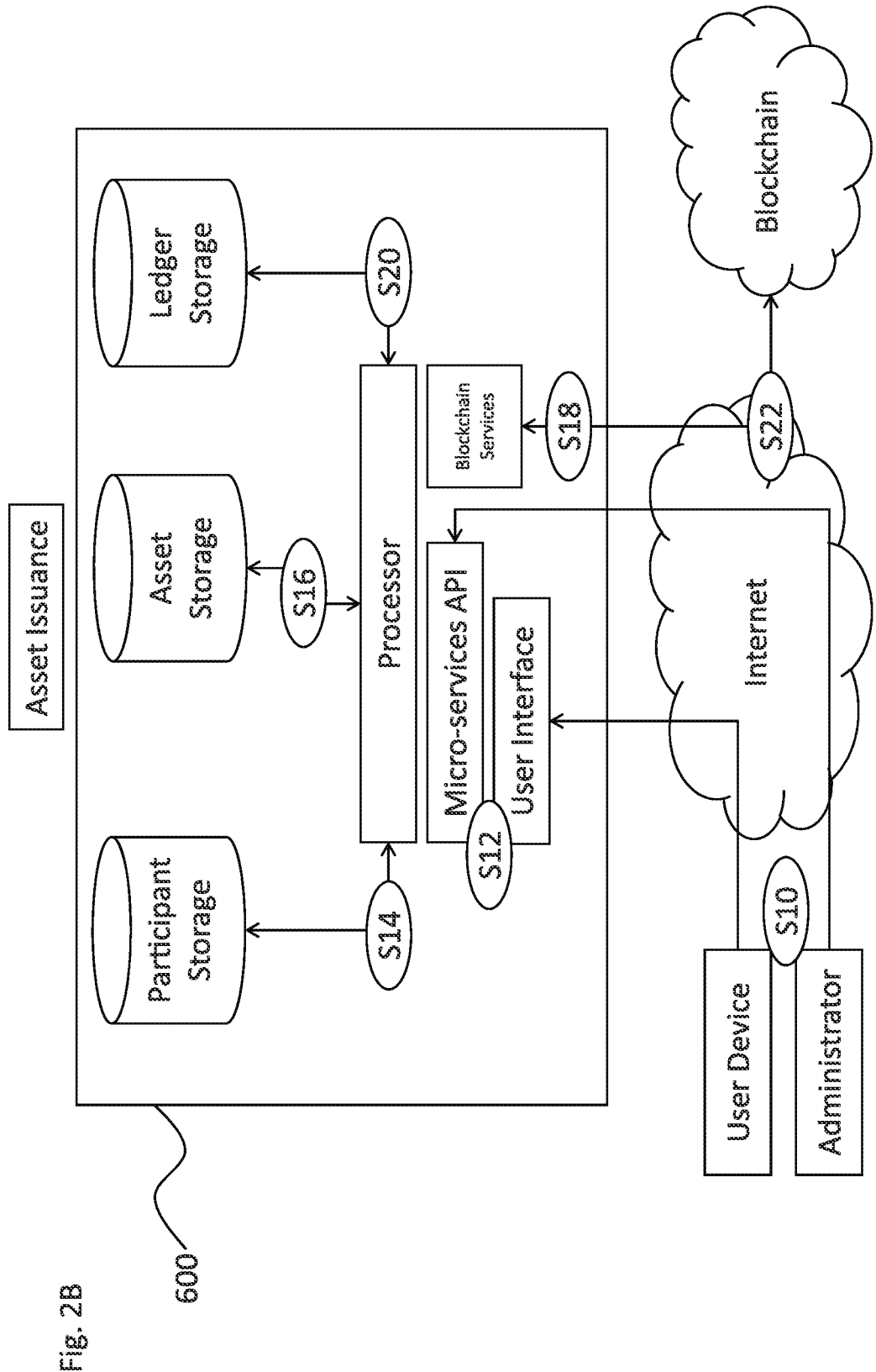
FIG. 2B shows an example process for issuing digitally based assets on the system shown in FIG. 1.
Figure 2C:
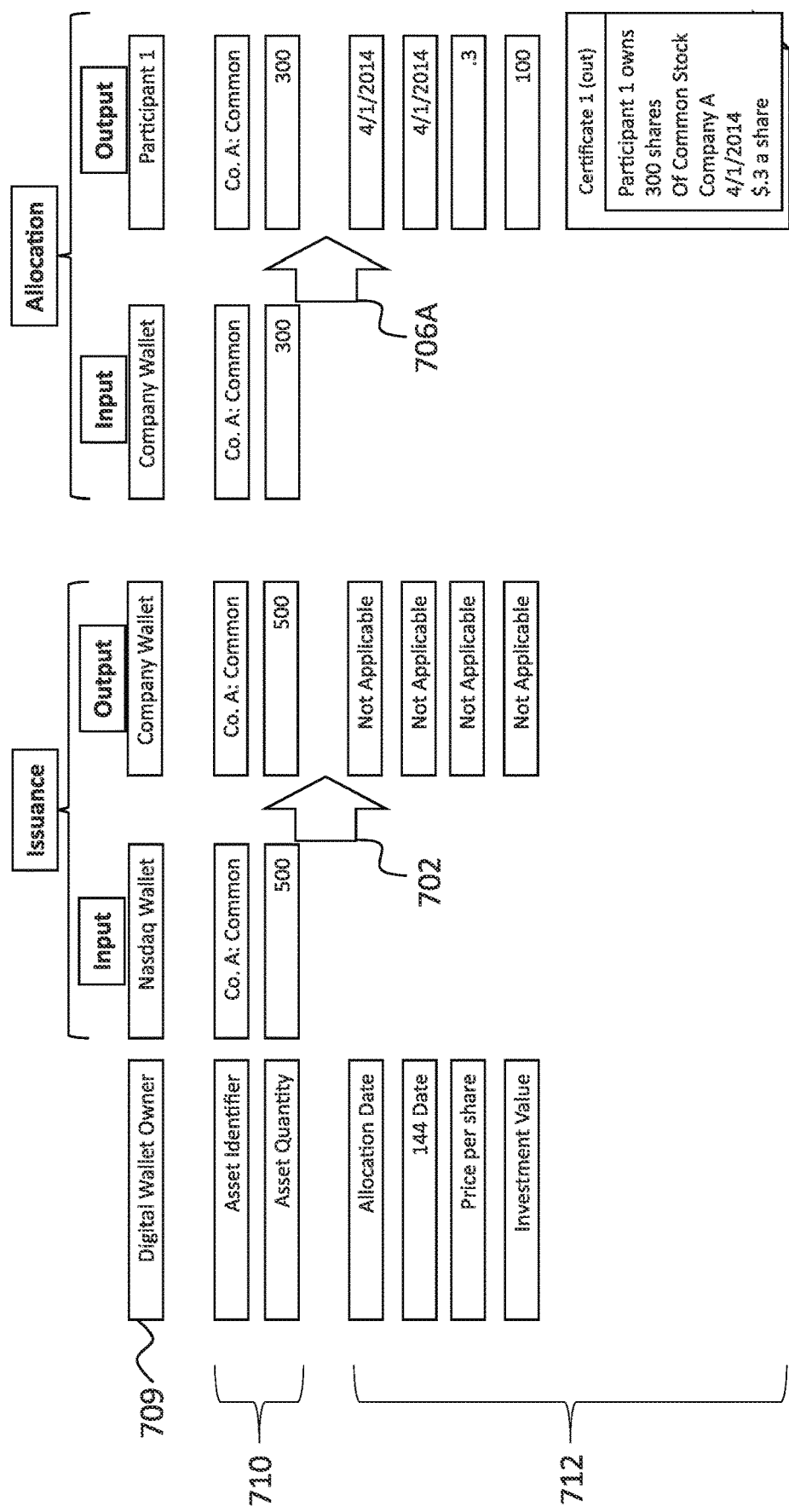
FIG. 2C shows example transactions that occur in relation to issuing digital assets according to certain example embodiments.
Figure 3A:
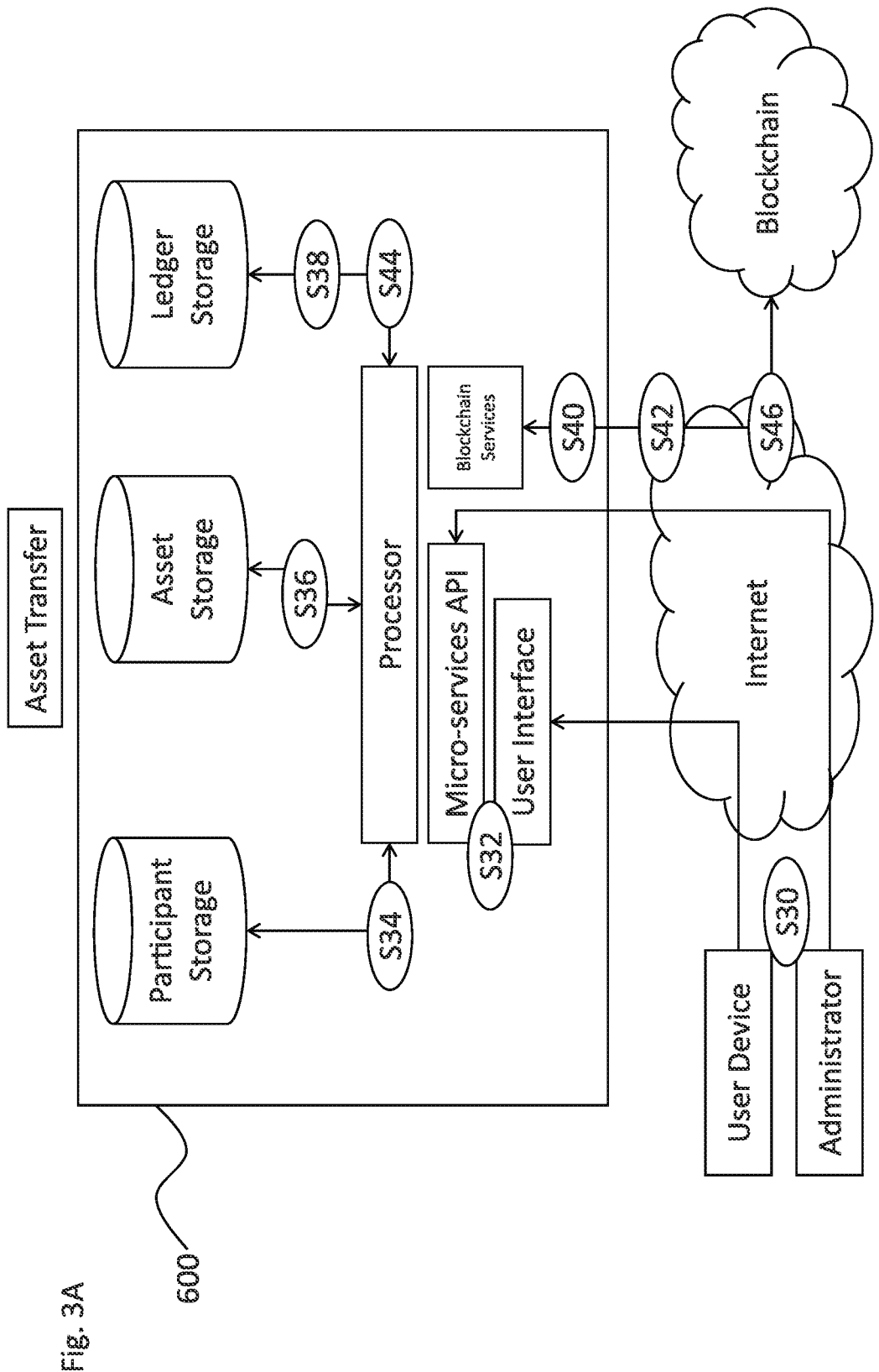
FIG. 3A shows an example process for transferring digitally based assets on the system shown in FIG. 1.
Figure 3B:
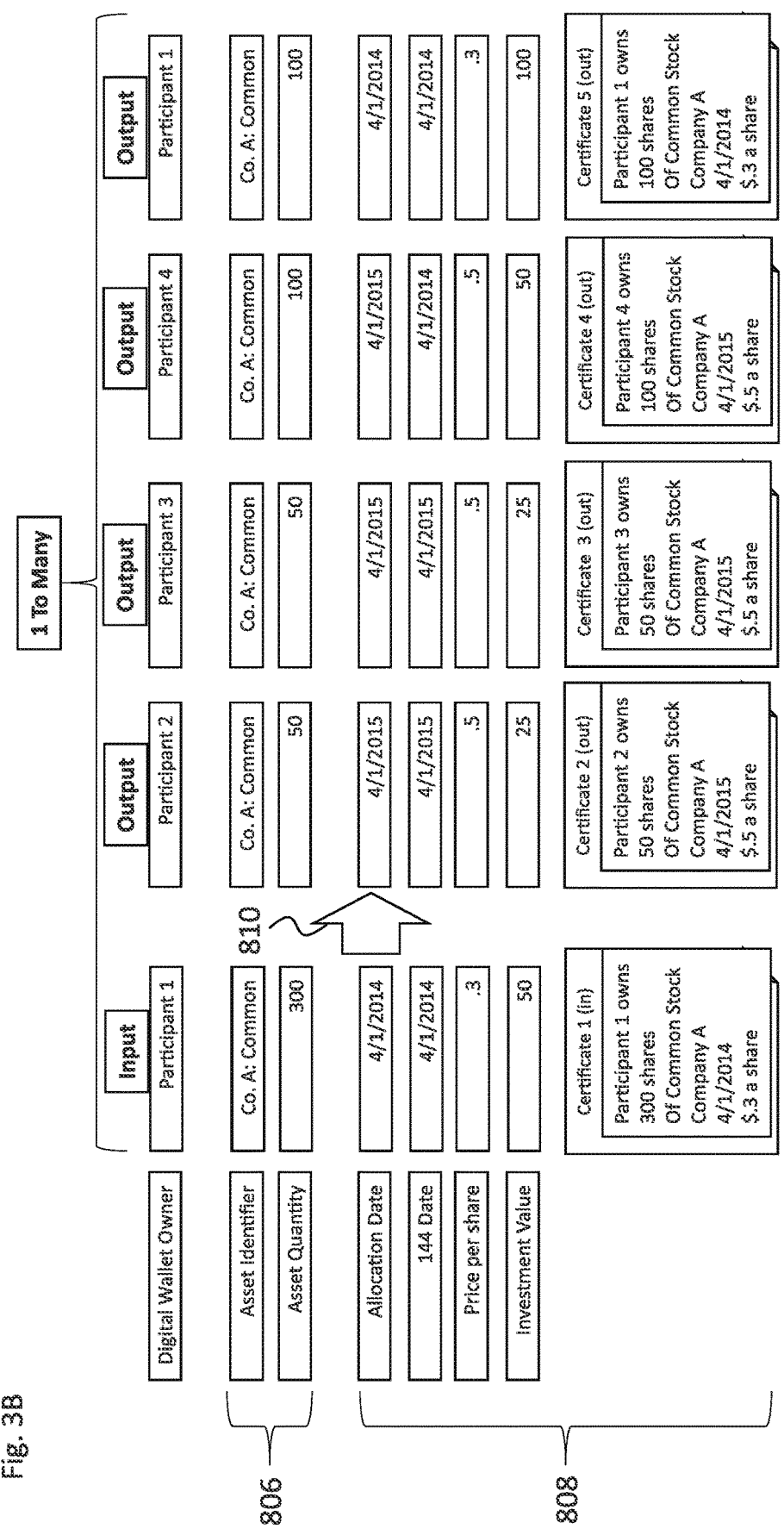
Figure 4:
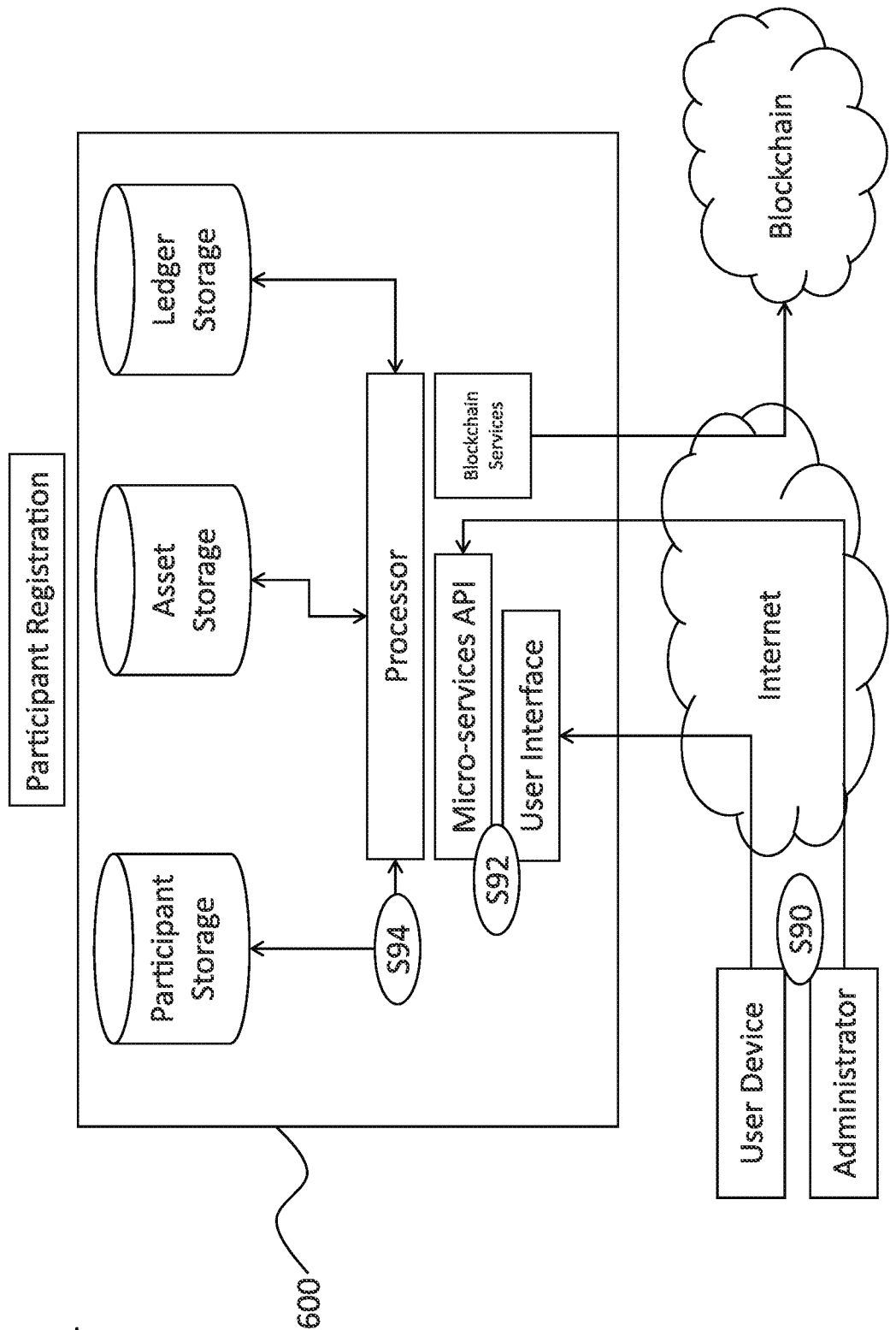
FIG. 4 shows an example process for registering participants that are then allowed to interact with certain digitally based assets via the example system shown in FIG. 1.
Figure 7B:
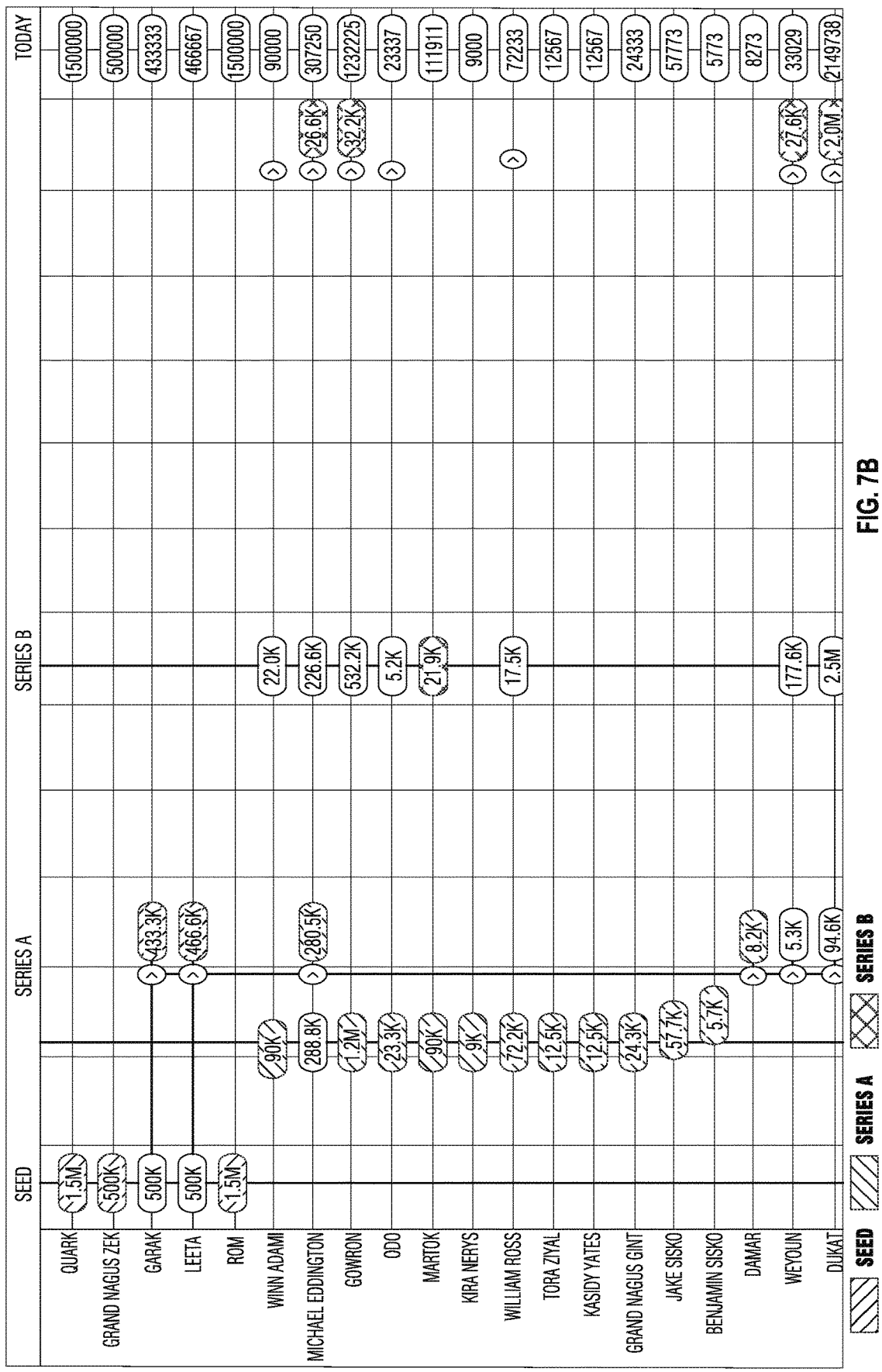

FIG. 1 illustrates a non-limiting example function block diagram of a digital asset repository computer system that interfaces with a blockchain according to certain example embodiments. FIGS. 2A-2C show or digital assets are issued using the system shown in FIG. 1. FIGS. 3A-3C show examples of how digital assets are transferred using the system shown in FIG. 1. FIG. 4 shows an example process for registering participants with the example computer system shown in FIG. 1. FIG. 5 is a non-limiting example function block diagram of a computer system that may be used to implement the features in FIGS. 1-4 and 6-8. FIG. 6 is signaling diagram that shows an example blockchain transaction being performed between an issuer and investor for a contract on the blockchain. FIGS. 7A-7H are example screen shots of a user interface used to visually show participants aspects of the computer system that interfaces with the blockchain. FIG. 8 is an example computer system that may be used as a node that is part of the blockchain or as the digital asset repository computer system.

Certain example embodiments provide a digital asset repository computer system for buyers and sellers to connect and trade privately issued assets. Privately issued assets may be assets of various security types. This may include, for example, equity or debt interests of private companies, private commercial enterprises, limited liability companies, partnerships, and other corporate entities whose privately issued assets (which include shares, stock, membership units, membership interests, partnership interests, etc.) are not traded via a public exchange or stock market. In certain example embodiments, private companies, Limited Liability Companies (LLCs), partnerships, and other business entities (collectively referred to in this disclosure as "private companies") may participate in secondary sales of their privately issued assets, have at least partial control over the manner in which such privately issued assets are traded, have at least partial control over who can sell and/or buy, set transaction-specific and/or user-specific limitations, and the like.

FIG. 1

FIG. 1 illustrates a non-limiting example function block diagram of a computer-implemented digital asset repository computer system (also referred to herein as a digital resource repository computer system) 600 that interfaces with blockchain 618 according to certain example embodiments. The digital asset repository computer system 600 may include a combination of software and hardware interfaces, programmed business logic, processing resources, and electronically addressable storage. The digital asset repository computer system 600 is responsible for tracking and executing computer programs for the purpose of maintaining an accurate digital ledger of asset ownership.

Digital asset repository computer system 600 references or includes records or data for users, participants, digital assets, and blockchain transactions. Participants are identifiable entities (e.g., that are unique) that can be assigned ownership of a digital asset that is also tracked by the system. For example, a company that is issuing one million shares may be a participant within the system. Users can be uniquely identifiable entities that have permissions to view, update, and/or control information within the system. In certain instances, a user and participant may be the same or different. For example, in the case of a company, the company may have multiple authorized users that interact with the system on behalf of the company. In another example, an investor may be both a participant and a user in the system.

Digital assets (also referred to as resources herein) are also identifiable entities (e.g., that are unique) that can be tracked, managed, and verified by the computer system 600. For example, when a company first issues shares of class A stock, the class A stock for that company will be one asset tracked by the system.

FIG. 7A shows an example screen shot of a user interface that shows different resources that have been created for one company. The three different resources for this company are "seed," "series A," and "series B." These are all unique resources that are tracked by the computer system 600 and, as described in greater detail below, incorporated as part of generated and validated blockchain transactions.

Transactions for privately issued assets are digital transactions that have been submitted and/or validated by a corresponding blockchain (e.g., a public and distributed digital ledger) 618.

The blockchain 618 is maintained, stored, and updated, by multiple different computer nodes that each operate to "mine" and thereby validate transactions submitted to the blockchain 618. Generally, only one of the nodes needs to "receive" a transaction that has been submitted from a client (e.g., the computer system 600). Once one node receives a transaction it may propagate the transaction to other nodes within the distributed computer system that provides the blockchain 618. In certain examples, different entities may control different ones of the computer nodes that are responsible for maintaining the blockchain. For example, the issuer of an asset may have one node, an auditor may have another node, a regulator (e.g., the SEC) may have another node, the entity that controls the computer system 600 may supply block generator nodes (e.g., that are dedicated to performing the cryptographic calculations of the blockchain).

In certain example embodiments, the blockchain may be a private blockchain implementation (e.g., where only authorized parties are allowed to read and/or write to the blockchain). In certain example embodiments, the blockchain 618 may include nodes used for issuing assets (resources) and nodes that are used for transacting or moving assets/resources between participant identifiers of the blockchain 618.

Issuer nodes may each hold one or more private keys and be responsible for creating new assets associated with a specific asset type. In certain examples, each node has one private key used for creating and/or digitally signing assets that are to be created by that node (e.g., multiple asset types may be digitally signed or created with the same key). In other examples, each asset has its own unique private key. In certain examples, there is one issuer node per asset type and the issuer nodes on the blockchain may be virtual machines (e.g., such that multiple virtual machines may be executed on one computer system).

Another type of node that is part of or interacts with the blockchain 618 may be a manager or transacting node that is used to move assets from one participant (e.g. the issuing company) to another participant (e.g., an investor). To allocate shares from, for example, a company to an investor, an allocation blockchain transaction is generated with an input from the issuer address (e.g., the identifier of the company that "holds" the shares). This type of transaction is generated by a manager or transacting node. This transaction is then digitally signed by a private key held by the manager node. In certain examples, each manager node has a corresponding private key that is used to digitally sign such allocation transactions (e.g., between participants). Once the transaction is generated, submitted, and validated by the blockchain, then the quantity that is included with the transaction is effectively "held" by the participant identifier that received the transaction (e.g. as an unspent output).

Each transaction (or a block of transactions) is incorporated or included into the blockchain 618 via a proof-of-work mining process. The mining process may involve solving a computationally difficult problem that is also easy to verify. For example, each node may attempt to "mine" a solution to the hash of a block or a transaction. Hashes (also referred to herein as "hash functions," "cryptographic hash functions," and the like) include functions that map an initial input data set to an output data set. The output from a hash function may be referred to herein as a "hash identifier," "hash value," "hash data set," or simply, a "hash"). Generally, the output values from a given hash function have the same fixed length. Generally, if the same hash function is used on the same input data it will result in the same output data value. With some hash functions (including those used in the context of blockchain techniques and/or the subject matter of this application) the input value is computationally difficult to determine when only the output value is known. In certain examples, the input value for the hash function is supplemented with some additional random data. For example, an input value of "blockchain" for a hash function may include addition random data such as three random characters. Accordingly, the data value that is hashed may be "blockchaina5h" instead of simply "blockchain." The additional random data is sometimes called a "nonce."

In order to validate a new block into the blockchain, the proof of work process (or hash operation process) that is performed may include finding an input hash value (i.e., the block) that results in an output hash value that meets a given condition. As the data related to the blockchain transactions in the block are fixed, miners (e.g., nodes on the blockchain) modify the nonce value that is included as part of the block being validated until the output value of the hash function meets the given condition. For example, a target output value may have 5 zeros as the first four numbers of the hash. This is a problem that may be computationally difficult to determine, yet relatively easy to verify. Each node that is part of the distributed computer system may also keep a copy or a portion of the blockchain 618 in storage (e.g., on disk or in RAM) that is local to the corresponding node.

The blockchain 618 may thus provide secure data provenance, immutability, protection from double-spend problems, and distributed record keeping (e.g., may different entities may have nodes that are part of the distributed system that maintains the blockchain).

Digital asset repository computer system 600 includes computer processor (processor) 608 that executes or runs the micro-services application programming interface (API) 610 and user interface 612 (e.g., that generates and provides web pages or other user interface elements that may be rendered into the screens of FIGS. 7A-7H that may be shown on a user device, such as 614A and 614B). The processor 608 also runs blockchain services 616. Blockchain services 616 may include functionality to both send and receive blockchain related transactions and events. For example, a transaction may be submitted to the blockchain 618 for validation. In addition, a validated transaction may be detected or received at the digital asset repository computer system 600 via blockchain services 616. It will be appreciated that processor 608 may be one or more processors. In certain examples, processor 608 represents a distributed computing system.

Micro-services API 610 is an application programming interface that allows machine readable data retrieval and interaction with digital asset repository computer system 600 by external computing sources. Such interaction may be performed via web services or a messaging based protocol that allows an administrator on computing device 614B (e.g., a mobile device, a PC, a tablet, etc. . . . ) to interface with digital asset repository computer system 600. For example, the micro-services API may provide a data stream that indicates when transactions have been submitted to the blockchain, when they have been validated, etc. . . . . . In certain examples, micro-services API 610 may be used to modify, add, or delete, information regarding assets, transactions, users, or participants. In certain example embodiments, the micro-services API 610 may provide the data that is used to render screen shots 7A-7H.

User interface 612 allows a user, via user device 614A, to view, update, and/or control the digital ledger through pre-programmed actions. Users can view the digital ledger (an example of a digital ledger is shown in FIG. 7B, where a user is presented with the screen that shows the transactions for a given resource or asset), which represents ownership records for assets defined in asset storage 604, and interact with the data contained therein through a set of pre-programmed actions. A fully auditable record of every interaction with the ledger may be created and stored for subsequent review. In certain examples, the user interface 612 may be in the form of a web page or dedicated client application (e.g., as shown in connection with the screenshots of FIGS. 7A-7H).

Digital asset repository computer system 600 includes at least three data repositories. These three repositories may be included as part of a single database (e.g., a relational database), may be separate databases, or may be stored by using other techniques (e.g., a flat file, or other data structure). In certain examples, the storage repositories of the digital asset repository computer system 600 are located in-memory and/or on separate logical or physical devices.

Participant storage 602 includes records of all participants that can own or otherwise interact with resources defined within the system. Participant storage 602 may include public keys, private keys, and blockchain addresses or participant identifiers (e.g., derived by using a one-way hash of a public key) associated with the participant and these may be used for tracking blockchain transactions made by that participant. In certain examples, one or more of the elements may be saved (e.g., private keys used to digitally sign transactions can be saved in an encrypted state). In certain example embodiments, the participants (e.g., a computing system controlled or maintained by those participants) can manage their corresponding private keys separately from the digital asset repository computer system 600. Thus, when digital asset repository computer system 600 interacts with a blockchain to create a blockchain transaction that is to be digitally signed by that participant, the computing system controlled by the participant may supply the private key and/or may digitally sign the transaction and transmit the digitally signed transaction back to the digital asset repository computer system 600 for subsequent submission to the blockchain 618 for verification. In certain examples, the participant storage 602 includes a digital wallet for each of the respective participant.

In certain examples, the private keys for each participant are different. Alternatively, the private keys for each participant may be shared. For example, if a private blockchain used as blockchain 618, then the entity controlling the blockchain may use the same private key for all participant identifiers. Accordingly, when a blockchain transaction from A to B may be digitally signed using the same private key as is used for a blockchain transaction from B to C.

A digital wallet is software and hardware (or specifically designed hardware) that allows a participant or user to generate and/or digitally sign blockchain transactions. The digital wallet can include a private key (e.g., that is known to the participant or user that the digital wallet is associated with) and a series of identifiers (sometimes call digital wallet identifiers, walletIDs, blockchain identifiers, etc. . . . ) that have been generated based on the private key. These identifiers are used to allow other users to "send" blockchain transactions, which are recorded on the blockchain, to that identifier. Software associated with the digital wallet (e.g., via blockchain services 616) may then be used to query the blockchain to determine what unspent transactions (e.g., those transaction outputs not used as input for another transaction) are associated with the identifiers that are in the digital wallet. Such software may then present a holistic view of what is "owned" by the holder of the digital wallet. For example, one hundred different transactions of 1 share of a company on the blockchain (each associated with a different identifier) may be identified and then presented as 100 shares of the company. Thus, the identifiers that are stored in participant storage or a corresponding digital wallet may be transparent from the perspective of the user.

Asset storage 604 (sometimes also referred to as resource storage) includes records of all of the assets or resources tracked by digital asset repository computer system 600. For example, each class of share issued by a company may be a separate resource record in asset storage 604. An asset or resource record may include the participant identifier (e.g., for a corresponding company) that the asset is associated with, a unique identifier that is used to uniquely identify the asset on the blockchain (e.g., which may be, for example, a 160 bit hash value of a public key associated with the asset), a public key that may be used to generate the unique identifier, a private key that may be used to generate the public key (e.g., via elliptical curve cryptography or the like), attributes that define the type of asset (e.g., asset type, class of shares, specific issuance), a number of shares that have been issued for this asset type, when the asset was created, etc. . . .

Ledger storage 606, in conjunction with blockchain services 616, interfaces with the blockchain 618 to store records of validated (or to-be-validated) blockchain transactions. A record in ledger storage 606 may include source and destination identifiers that are mapped back to respective participants (e.g., stored in participant storage 602), a blockchain transaction ID, the unique identifier for the asset, an asset transaction quantity, a transaction date (e.g., when the transaction was submitted to the blockchain), a validation date (e.g., when this transaction was ultimately validated by the blockchain), a price per share, and/or a price of the asset transaction, etc. . . .

FIG. 2A illustrates example digital transactions that occur in a computer-implemented digital asset repository system when a resource or asset is first issued by the system 600. In certain examples, as a prerequisite to "issuing" new shares, if Company A is not already created, then it is created as a new company and added to participant storage 602 (see FIG. 4).

If this is the first time shares of a specific asset are being issued, a new asset type will be created in correspondence with this transaction. This may include creating new private and public keys, and a unique asset identifier for that newly created asset. Thus, for example, a new blockchain address and corresponding private and public keys may be created.

This newly created data may be saved along with the asset definition (e.g., class of share, quantity to be issued, etc. . . .) in asset storage 604.

FIGS. 2A-2C

In certain example embodiments, and as shown in FIG. 2A, creating a new asset may also involve an initial blockchain transaction "to" the unique identifier for the asset in the form of an amount of cryptographic currency. For example, a blockchain transaction that moves an amount of bitcoin (or other cryptographic currency) from the digital wallet associated with the digital asset repository computer system 600 (e.g., a unique identifier for that digital wallet)

As shown in FIG. 2A, after creation of the asset and its corresponding data, then a blockchain transaction 701 is generated to initialize and/or enable "asset" 708 to issue new shares. Blockchain transaction 701 thus "sends" an amount of crypto-currency from the unique identifier associated with the private exchange 700 to the unique identifier that was created for the asset 708. This transaction 701 includes the public key of the private exchange 700 and is digitally signed by the private key of the private exchange 701 (e.g., as with a normal blockchain transaction). As a result of blockchain transaction 701, an amount of crypto-currency (e.g., satoshis in a bitcoin example) is associated with the unique identifier of the asset (e.g., as an unspent output). The asset, by using its associated private key, may then "issue" a quantity of the newly created asset by having the cryptocurrency amount "carry" (e.g., as a colored coin or the like) the asset as part of the blockchain transaction. In certain example embodiments, transaction 701 may be added to the ledger store 606. However, in other embodiments it is not added to the ledger store 606 because this transaction does not move the asset from one entity or participant (e.g., the unique identifiers associated with that entity) to another.

Once there is an unspent amount of crypto-currency associated with asset 708, it may then "issue" shares of the asset and have transactions of the issuance verified by the blockchain (e.g., as originating from the asset 708).

Thus, transaction 702 may be generated for 500 shares and represents the creation of shares that can be subsequently distributed to investors from company A 703. Transaction 702 is a blockchain transaction that is from the unique identifier associated with the asset to the unique identifier associated with Company A 703. Transaction 702 also includes the public key of asset 708 and is digitally signed using the private key of both the asset 708 and private exchange 700. Transaction 702 may then be submitted to the blockchain, verified, and also added to ledger storage 606.

Subsequent distributions to participants 1 and 2 are made in the form of blockchain transactions 706A and 706B to the unique identifiers (e.g., a blockchain address) 705 and 707 that are respectively associated with those participants. These transactions (which may be a single one-to-many blockchain transaction) are digitally signed by the private key of Company A and submitted to the blockchain and recorded in ledger storage 606.

Other example techniques may be used in combination with (or alternatively to), the issuance process described in connection with FIG. 7A. For example, transaction 701 and 702 may be one transaction that is generated to the identifier 703 associated with company A (e.g., which may be similar to a coinbase transaction in a conventional bitcoin implementation).

A constructed issuance transaction may take an asset identifier as an input and have, as outputs, the asset identifier, an amount of the asset, participant identifier (e.g., a blockchain address). In certain examples, a script address may also be provided (e.g., that specifies a hash of an unlocking script).

In certain examples, each transaction may be effectively digitally signed by the multiple private keys (or requires the digitally signature of multiple keys). For example, one private key (or a collection or private keys) may be associated with the issuer and/or manager nodes discussed herein. Alternatively, a key may be controlled by the entity that controls or manages the blockchain 618. Another key may be associated with, for example, the entity that controls computing system 600. And a third key may be held in escrow. Every transaction on the blockchain may be digitally signed by or require 2 out of 3 of these keys in order to unencumber the transactions. Accordingly, for example, if the key associated with computer system 600 is lost, the escrow key and the blockchain key may be used to still spend unspent blockchain transaction outputs.

Thus, T1, T2 (or T1T2 if these are one transaction), T3, and T4 can be digitally signed by and/or require two different private keys that are respectively held by different computer systems and/or entities. The 2 key requirement can help ensure that there is agreement when a transaction (such as a share allocation) should be generated and validated.

FIG. 7B illustrates an example user interface that shows a transaction from Garak and Letta to Weyoun and Dukat. This may show the full timeline of a given resource, asset, or equity that is being transferred among the listed participants. This allows auditors or other 3rd parties to more readily grasp the transactions that have occurred. As discussed herein, this may be particularly advantageous in areas (such as private equity offerings) that have had more ad-hoc to recording such transfers.

Initially, Garak and Leeta both had 500 k of a "seed" type of an asset (e.g., that is a separate asset type that series A or series B). The blockchain transaction that is generated has both the quantity of Garak and Leeta as inputs to the blockchain transaction and quantity to Weyoun, Dukat, Garak, and Leeta as outputs to the transaction. This is a many-to-many blockchain transaction. Another one-to-many transaction is shown from Michael Eddington to Damar with Michael providing the input and outputs associated with both Michael (e.g., the remainder) and Damar.

In certain example embodiments, many-to-many transactions may be used in conjunction with an auction process that may be performed by the computer system 600. FIG. 7C shows an example view of an in-progress auction that has 3 buyers and 11 sellers. Here the positions or holdings of each of the individuals can be validated against the blockchain to ensure that both buyers and sellers have what they are putting into the auction. In the case of buyers, this could be in the form of verifying that an appropriate amount of money is available. This could be represented through a digital token issued by an escrow or transfer agent that is holding the money. Conversely, the positions offered by the sellers can be verified against the current blockchain transaction records (e.g., that Odo does in-fact have enough quantity to offer the listed amount).

At the conclusion of the auction (e.g., when the auction is executed), a transaction price for the auction will be determined. The transactions to carried out as a result of the auction may be included in one single blockchain transaction (e.g., from the 11 participants to the 3 buyers). Such a many-to-many blockchain transaction may be visually presented to users (e.g., on a corresponding user device) as shown in FIG. 7D.

Figure 7D:
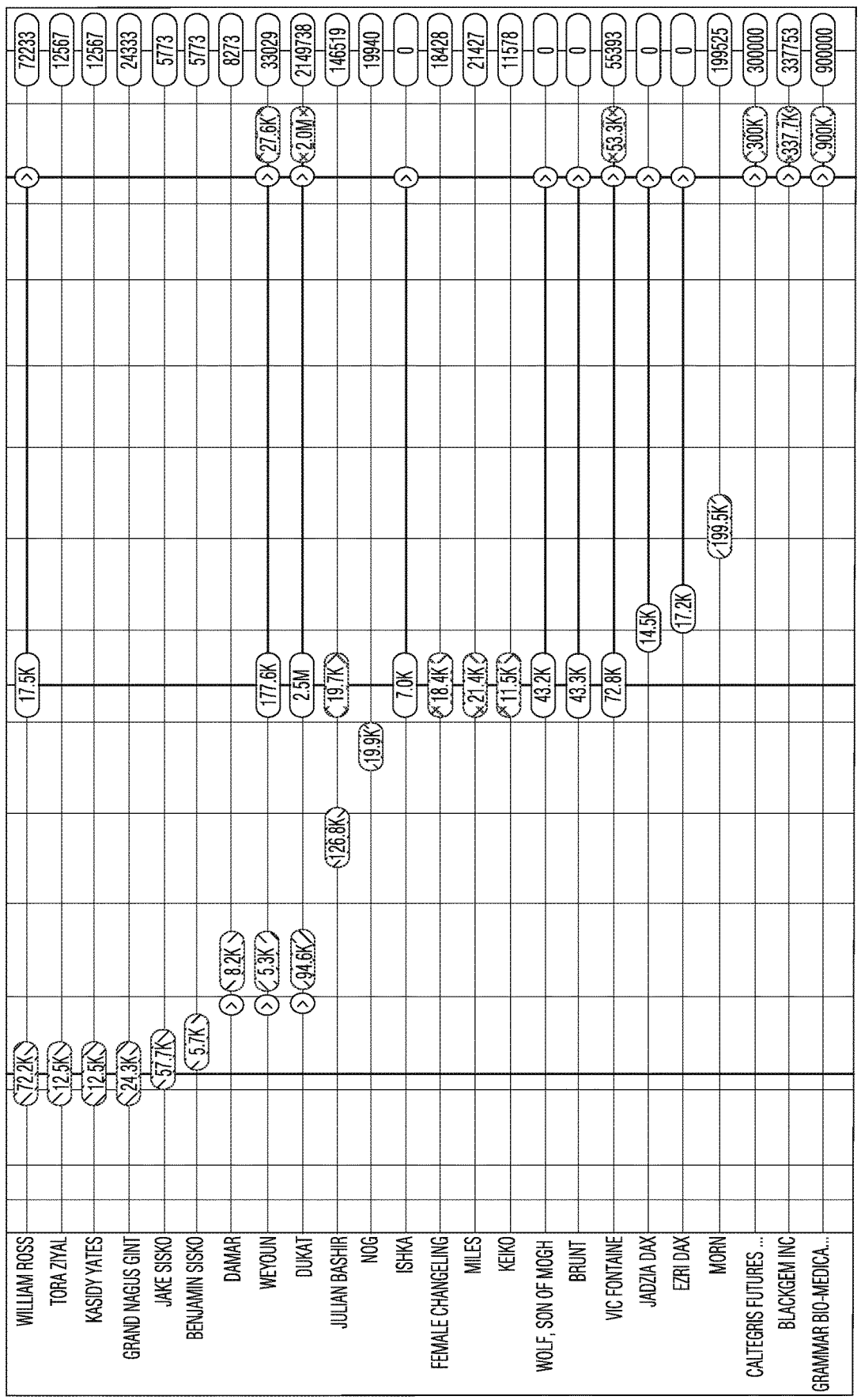
Figure 7E:
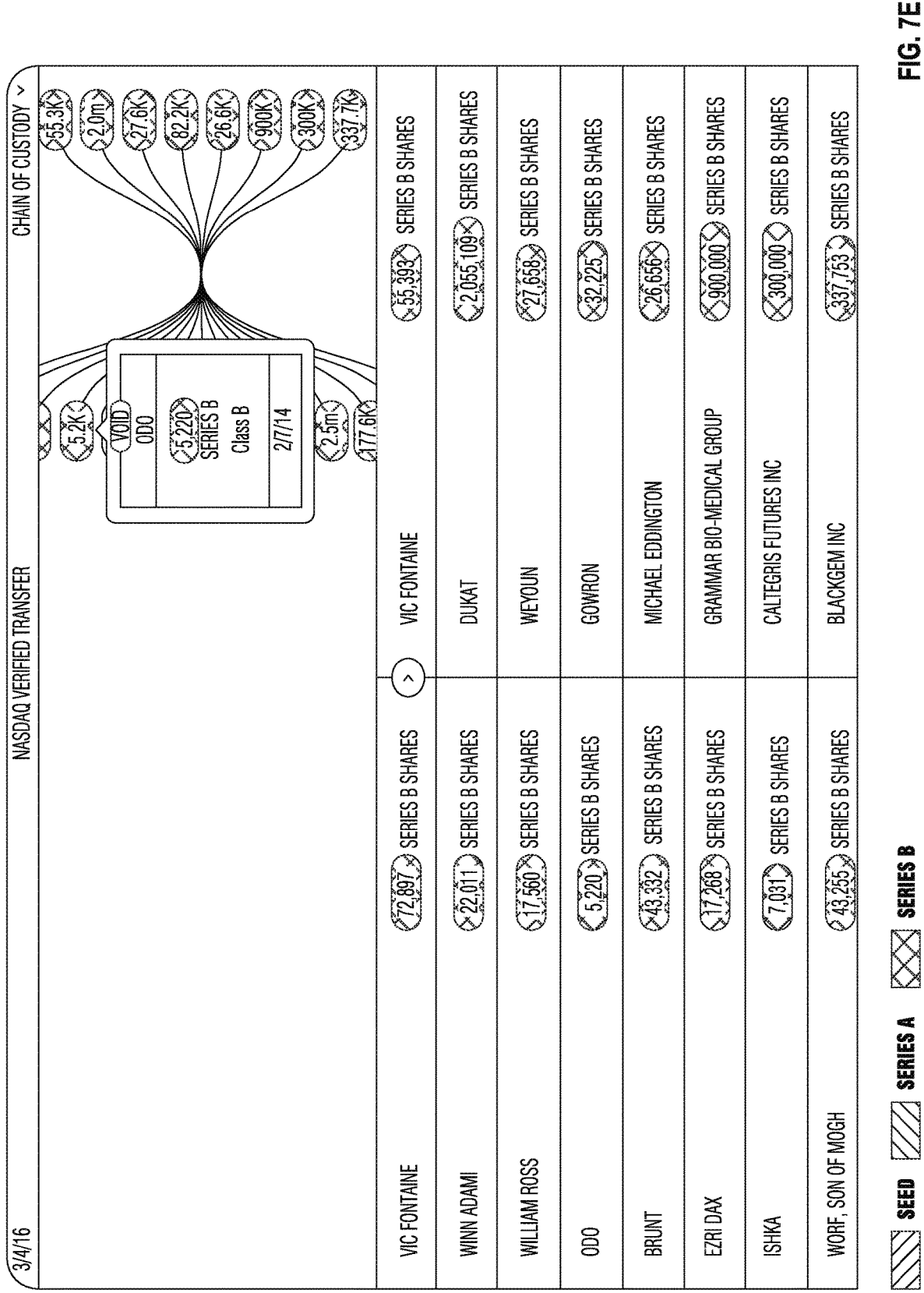
Figure 8:
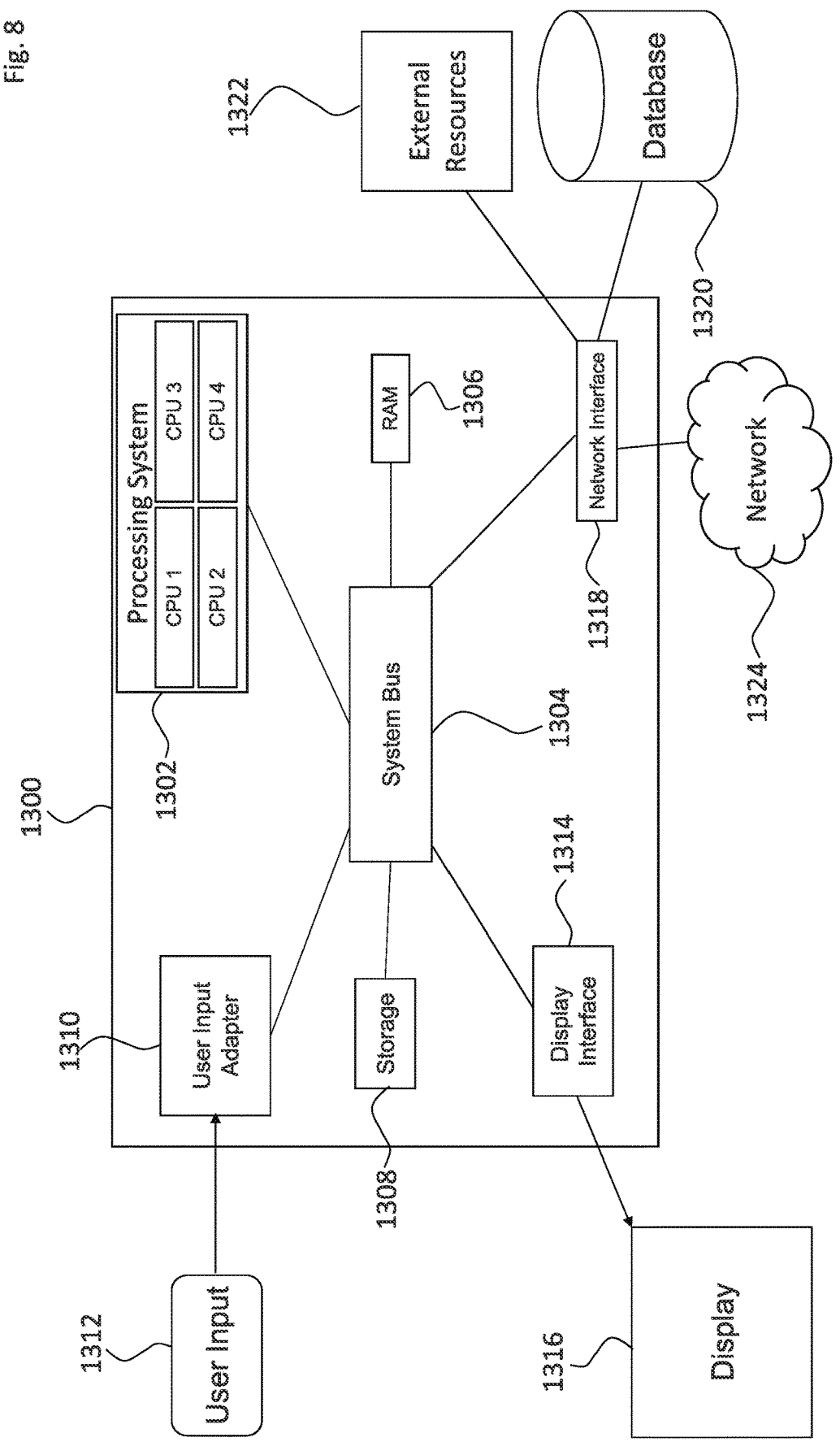
FIG. 8 is an example computer system according to certain example embodiments.

FIG. 7D indicates, for example, that William Ross has completely zeroed out his initial position of 17.5 k as there is no remainder associated with him after the transaction is executed. Conversely, Blackgem Inc. now has a position of 337.7 k. Other participants have reduced their positions. FIG. 7E shows another user interface screen shot that illustrates all of the parties that participated in this many-to-many transaction. This shows the old positions (on the left) and the new positions (on the right). This type of user interface screen may allow users to track the chain-of-custody of an asset as it has moved between different participants.

In certain example embodiments, the transactions (e.g., from Company A to another participant) may be digitally signed by a private key that is centrally controlled and associated with computer system 600. In other words, assets may be moved from the address associated with a company (or the system, the asset, or other participants) to another address with a transaction that is digitally signed by a private key/public key combination that is associated with computer system 600. Indeed, various types of cryptographic access to the assets may be employed according to the embodiments described herein including multi-signature embodiments where a participant and the system 600 (or participant and company) both digitally sign a transaction.

FIG. 2B shows an example process for issuing digitally based assets on the system shown in FIG. 1 and FIG. 2C shows example transactions that occur in relation to issuing digital assets according to certain example embodiments.

In S10, a user or system administrator with sufficient permission to act on behalf of a participant (e.g., Company A) provides user input to user device 614A or 614B, the user input indicating that a new asset for participant should be issued. In response to this user input, the user device 614A or 614B sends an electronic message to the digital asset repository computer system 600. The electronic message includes a digital resource issuance request that a new asset for the participant is to be issued. The electronic message is received by a transceiver of the digital asset repository computer system 600 and is passed to the user interface 612 or micro-services interface 610 for processing.

In S12 and as part of the processing, the contents of the electronic message are extracted and mapped to a command (or set of commands) that corresponds to the request included in the message (e.g., a request to create and issue a new asset). The corresponding command(s) may then be automatically executed by the processor 608 of the digital asset repository computer system 600.

As part of the executing commands, in S14, the processor 608 identifies the participant that is to be associated with the asset issuance transaction. For example, a private key, public key, and/or unique identifier for the participant may be retrieved and used for formulate blockchain transaction that is subsequently created. In certain examples, a new unique identifier and/or public key may be created for this particular transaction and be associated with the blockchain digital wallet of the participant. This new information may be derived by using the private key that is associated with the participant. Thus, a participant may be associated with multiple different public keys and/or unique identifiers (e.g., blockchain addresses).

In S16, processor 608 creates a new private key that will be used to sign any subsequent issuances of this asset. A public key based on the private key (e.g., a hash thereof) may also be created. The public key may also be hashed to generate the unique identifier (e.g., a blockchain or bitcoin address) that uniquely identifies the asset in the digital asset repository computer system 600 and on the blockchain 616. The newly created private and public key, unique identifier, and other associated information (e.g., asset type, number of shares to be issued, date of issuance, and/or other data that can vary based on the type of asset being issued) will be stored in asset storage 604. The private key for the asset ensures that no other entity will be able to duplicate the asset that has been created by the digital asset repository computer system 600 and issue blockchain transactions that include that asset. In certain examples, this assurance is accomplished because all assets for a particular asset must originate from the blockchain address (the unique identifier that is based upon the private key for that asset) associated with that same asset. The initial blockchain transaction includes the public key of the asset and is signed by the private key of the asset. Thus, a blockchain transaction is created from the unique identifier of the asset to another identifier (e.g., associated with a participant). This cryptographic process ensures that only an entity or system (e.g., digital asset repository computer system 600) that controls the private key associated with the asset can issue additional quantity of that asset.

In certain examples, a participant may not wish to create a new asset, but may rather wish to expand an existing asset that is already defined within the digital asset repository computer system 600. For example, company A 703 in FIG. 2A initially issued 500 shares and now wishes to issue 500 additional shares. Thus, data that indicates the asset (e.g., the unique identifier for asset 708) may be part of an initial electronic data message that is sent from a user device 614A to the digital asset repository computer system 600. This information may then be used to retrieve the private key for the digital asset and thus generate a new blockchain transaction (which includes the public key of the asset and is signed by the private key of the asset) that is "from" the unique identifier associated with the asset to the unique identifier associated with the participant that is issuing the asset (e.g., the company). In correspondence with generation of the new blockchain transaction, the digital asset repository computer system 600 may update the corresponding asset record included in asset storage 604 (e.g., by adding or subtracting quantity). Alternatively, a new entry (e.g., a new database record) may be created that indicates that particulars of this specific asset issuance.

In any event, in S18, a new blockchain transaction is created and submitted to the blockchain to record the issuance of the new shares to the participant. In certain example embodiments, the shares will be issued from the unique identifier of the asset to the unique identifier of the participant (e.g., its digital wallet). Alternatively, the blockchain transaction from the unique identifier associated with the entity that operates the digital asset repository computer system 600 (e.g., 700 in FIG. 2A) to the unique identifier of the participant (e.g., 703 in FIG. 2A).

More specifically, the processor 608 can be programmed to create a blockchain transaction made up of multiple inputs and outputs (such as the transaction shown in FIG. 7B). Generally, inputs can be the unspent outputs associated with a public address (a unique identifier)—which can be a participant identifier or the identifier for the asset. A transaction can be a combination of unspent outputs and new outputs that are directed to new public addresses (e.g., the address that the transaction is being "sent" to). The transaction that is being sent is also "signed" using the private key associated with the address where the inputs are coming from (e.g., the participant identifier for which the assets in question are associated with on the blockchain).

Thus, in the case of an issuance transaction (e.g., transaction 702 in FIG. 2A) the private key created with the asset is used to sign the transaction. In the case of a regular transaction (e.g., 706A and 706B in FIG. 2A) the hash of the private key corresponding to participant for which the asset is being transferred from will be used to sign the blockchain transaction. In certain examples, the process may be similar to the creation and submission of a blockchain transaction to the blockchain described in FIG. 2 of U.S. Patent Application No. 62/270,560. In certain examples, the quantity associated with the transaction is also included in the newly created blockchain transaction. In certain examples, the blockchain transaction includes (e.g., as an input) an assetID (e.g., the unique identifier for the asset) that is generated from the private key that uniquely identifies the asset. This assetID is then appended or added to the blockchain transaction.

Referring to FIG. 2C, a blockchain transaction may be created based on a combination of the information represented in fields 709 and 710. The created blockchain transaction is submitted, through blockchain services 616, to the blockchain 618 for validation by blockchain computing nodes that digitally "mine" the transaction. Once validated, the submitted transaction becomes part of an immutable record (the distributed blockchain ledger) that represents creation of this asset.

In S20 and in correspondence with creation and/or submission of the transaction to the blockchain, the outputs resulting from the blockchain transaction are returned back to or detected by the system 600 and the transaction is stored in the ledger storage 606. Such outputs may include a blockchain transaction ID. An example transaction ID is shown in the screen shot of FIG. 7G.

The information stored in ledger storage may include the blockchain transaction ID, a reference to the source and destination digital wallets (or the unique identifiers), an asset identifier, and an amount of the asset that is subject to the transaction. Other data that corresponds to the transaction may be added to ledger storage 606 and linked to the created blockchain transaction. Such information may include the information represented in fields 712 shown in FIG. 2C. For example, whether the transaction has been validated on the blockchain, what block in the chain the validation is associated with, a rule 144 date of the asset transaction, the price per share of the asset transaction, the investment value of the asset transaction, conditions associated with the asset transaction, etc. . . . It will be appreciated that these fields may vary based on what type of asset is being transacted and the type of transaction (issuance, transfer, re-classification, cancelation, etc. . . . )

In S22, digital asset repository computer system 600 monitors, via the processor 608 and blockchain services 616, the blockchain 618 to determine when the submitted transaction has been validated by the blockchain. Responsive to determining the submitted transaction has been validated, ledger storage 606 is updated to reflect that the transaction stored in S20 has been validated by the blockchain. The digital asset repository computer system 600 may determine that a transaction has been validated by reviewing validated blocks of the blockchain 618 as they are published.

FIG. 2C shows that issuance to an investor may be a two-step process that requires two (or three) separate blockchain transactions. Here, the operator of system 600 (e.g., Nasdaq) issues new shares as described above and expressly links this issuance to a transaction that is validated by the blockchain. The transaction submitted to the blockchain includes a unique, public identifier of the asset and an amount of the asset. This information is represented by fields 710 (e.g., "Co. A: Common" may correspond to the unique identifier). As discussed above, this information is, along with information 712, stored in ledger storage 606.

After validating transaction 702, company A (a participant in system 600) can issue 300 shares to participant 1 in the form of transaction 706A. This transaction will be based on the same unique assetID, but have a different quantity associated with it.

In certain example embodiments, digital asset repository computer system 600 may independently verify that the amount of assets being transferred from one participant to another participant is valid (e.g., that the first participant does "own" the assets being transferred). In other words, the blockchain may only verify that the underlying cryptocurrency amount for the blockchain transaction is valid, and not validate the quantity of the asset transaction. For example, suppose transaction 706A and 706B were both for 300 shares. The blockchain may verify both of these transactions as valid because the original asset issuance is from the asset identifier. However, the crypto-graphic process may not be able to determine that the sum of the amounts in the two transactions exceeds the initial 500 share allotment. Thus, digital asset repository computer system 600 may perform an independent check to verify that the quantities being transacted on the blockchain for a given asset are valid quantities.

FIGS. 3A-3C

FIG. 3A shows an example process for transferring assets from one participant identifier to another participant identifier of the system 600 shown in FIG. 1.

In S30, a user or system administrator with sufficient permission to act on behalf of a participant (e.g., investor A) provides user input to user device 614A or 614B, the user input indicating how many shares (or other quantity) are to be transferred and to whom (e.g., another participant) the shares are to be transferred to. In certain examples, the user also provides a price (e.g., a price per share or total price) that is associated with the transfer. In response to the provided user input, the user device 614A or 614B sends an electronic message to the digital asset repository computer system 600. The electronic message may include the destination participant (e.g., a unique identifier for the participant), the source participant (e.g., a unique identifier for the source participant), the asset (e.g., an asset identifier), and a quantity of the asset. The message is received by a transceiver (e.g., a network interface card) of the digital asset repository computer system 600 and is passed to the user interface 610 or micro-services interface 612 for processing.

In certain examples, assets that a participant can transfer may be presented to a user via a web page or the like. For example, FIG. 7F shows the number of shares that are associated with participant Leeta. In this illustration, the 500 k shares are "voided" because that quantity is associated with blockchain output that has already been spent (e.g., as shown in FIG. 7B). The new, and still valid 466k shares are associated with a blockchain transaction that has unspent outputs. A user can then choose which assets to purchase or sell. Based on this selection, the electronic message (e.g., an order) may be generated and submitted to the digital asset repository computer system 600.

For example, Leeta (or a user that is authorized to act on Leeta's behalf), may enter user input that indicates a request to transfer 50 k shares to Kira Nerys. In response to this input (and a correspond electronic message that is sent to the computer system), computer system will (e.g., automatically) use the blockchain transaction that is associated with the 466 k shares to make two further transactions (which are combined into one blockchain transaction). The inputs from the block chain transaction will be the 466 k shares from Leeta and the outputs will be 416 k to Leeta and 50 k to Kira.

In S32, an asset transfer request (e.g., as described above) is received and is mapped to pre-programmed functionality (e.g., a software program) that is executed by the processor 608.

In S34, processor 608 identifies the participants that will be involved in the transaction. As part of this process, the processor 608 accesses participant storage 602 to verify the participants and retrieves unique identifier public, and/or private key information. This information will be used to later form and sign the blockchain transaction.

In S36, processor 608 extracts, from the electronic message submitted by a user device, the asset that is the subject of the requested transaction and verifies the asset by accessing asset storage 604.

In S38, the processor verifies that the source participant of the transaction does, in fact, hold an appropriate quantity of the asset to complete the transaction. This verification is accomplished by accessing ledger storage 606 and determining that the source participant is associated with unspent output blockchain transactions that are linked to a sufficient quantity of the asset in question. This process may include summing multiple different blockchain transactions that are associated with the source participant to determine a total asset quantity that is "owned" by the source participant. In certain examples, if the processor determines that the source participant does not own sufficient quantity the transaction will be aborted and the order submitting user notified. In certain examples, only transactions that have been validated (e.g., those that are more than 1 block deep within the blockchain 618) are used to determine the total quantity owned by the participant. In other examples, non-validated transactions are also taken into account. In certain examples, non-validated incoming transactions of assets (e.g., the participant is the receiver) are not taken into account, but outgoing transfers (e.g., the participant is the sender) of non-validated transactions are taken into account. As part of the verification process, in S40, the processor 608 may also query, via blockchain services 616, the blockchain to verify the asset ownership.

After verification, in S42, the processor will generate a blockchain transaction based on private and public keys of the source participant, and any additional outputs that are needed from ledger storage 606 to formulate a further blockchain transaction. In certain examples, the blockchain transaction includes data from fields 806 and 822 of FIGS. 3B and 3C. The created blockchain transaction is then submitted, via blockchain services 616, to the blockchain 618 for validation.

In S44, in correspondence with submission of the newly created blockchain transaction to the blockchain, ledger storage 606 is updated with information related to the submitted transaction. This information may include the data fields shown in 808 and 824 in addition to data fields 806 and 822 that make up part of the created blockchain transaction.

In S46, digital asset repository computer system 600 monitors, via processor 608 and blockchain services 616, the blockchain 618 to determine when the previously submitted transaction has been validated by the blockchain 618. Responsive to determining the submitted transaction has been validated, the ledger storage is updated to reflect that the stored transaction (from S44) is a validated blockchain transaction. The digital asset repository computer system 600 may determine that a transaction has been validated by reviewing validated blocks of the blockchain as they are published.

FIGS. 3B and 3C show example transactions that occur in relation to transferring digital assets between participants according to certain example embodiments.

FIG. 3B is an example one to many transaction 810 (this may represent multiple blockchain transactions or one single blockchain transactions) that occurs between participant 1 and participants 2, 3, and 4. In certain instances such a transaction is referred to as a distributing transaction. Participant 1 is also included as an "output" because a new transaction occurs between Participant 1 and Participant 1 to reflect the reduced quantity of company A's common stock "owned" by Participant 1. Data fields 806 represent information included on the blockchain and data fields 808 represent data stored in ledger storage 606 and linked to the blockchain transaction (but this information is not stored directly on the blockchain according to certain example embodiments).

FIG. 3C is an example of a many-to-one transaction 826. Such a transaction could represent a share-buyback exchange or one participant (Participant 1) buying out other stake holders (2, 3, and 4) in an asset. Data fields 822 are fields that are present and part of the blockchain transaction and data fields 824 are fields that exist separately from the blockchain and stored in ledger storage 606. Here, participants 2, 3, and 4 have unspent blockchain transactions associated with 100, 50, and 50 shares of common stock of company A. Each of these unspent blockchain transactions is used as an input to form a transaction to Participant 1 that includes 200 shares of company A common stock. This newly created transaction is then submitted to the blockchain for verification. In certain examples, while the blockchain may verify that the unspent satoshi's (or other unit that is used for the blockchain) add up, there may be no blockchain verification that the asset quantities that ride along with the blockchain transactions add up. Accordingly, digital asset repository computer system 600 may include its own validation program to ensure that all inputs for an asset quantity are accounted for as outputs for the transaction. Thus, digital asset repository computer system 600 verifies that the 100, 50, and 50 shares of common stock are no longer associated with their corresponding participants and that 200 shares are now associated with participant 1.

It will be appreciated that one-to-many, many-to-one, and many-to-many transfers may be advantageous when handling assets in the private equity space. For example, in a traditional system the distribution of 20 shares to 100 different employees would require 100 different transactions. However, according certain example embodiments discussed herein, this type of distribution may be accomplished with one blockchain transaction that has 100 different outputs (or 101 if the source has leftover assets) associated with different unique identifiers for each of the employees (e.g., that may be participants in system 600). One example of a many-to-many blockchain transaction may be when an auction process is held as is shown in the example screens of FIGS. 7C-7E.

As with the other examples, in correspondence with the submission of the new transaction to the blockchain, one or more new records are created in ledger storage 606. In certain examples, multiple records are created (e.g., a row in a database table or the like) linking to the same blockchain transaction. In certain examples, one blockchain transaction record is created and added to ledger storage 606 that links to all three inputs and the one output.

It will be appreciated that other types of blockchain transactions may be created in connection with the example techniques described herein. For example, a many-to-many transaction (e.g., 2 or more inputs and 2 or more outputs) may be used for a transaction.

An example blockchain transaction for an allocation transaction may have inputs that include the asset identifier that is subject to the allocation, the participant identifier that is allocating some (or all) of their quantity, the amount that is "held" by the participant identifier for that asset identifier, the transaction identifier (or a hash thereof) of the prior transactions that have unspent outputs, etc. . . . If the participant that is allocating is not allocating all of their held quantity, then there will be two outputs, one to the transferee, and a remainder to the identifier of the transferor. Each of these outputs will be associated with a different blockchain address (e.g., the remainder will be associated with the same participant identifier as the source), and an amount of the asset being allocated.

FIG. 4

FIG. 4 shows an example process for registering participants that are then allowed to interact with certain digitally based assets via the example system shown in FIG. 1.

In S90, a user or system administrator with adequate permissions (e.g., permissions to create new participants) provides input to a corresponding user device that sends an electronic message via the user interface 612 or other API requesting that digital asset repository computer system 600 create a new participant for the system.

In S92, in response to reception of this message, the request included in the message is mapped to an appropriate command that is included as part of the API and then sent to the processor for execution In S94, in accordance with execution of the commands by the processor, a new participant will be created within the system. In certain example embodiments, a digital wallet or digital walletId (e.g. a bitcoin address) may be created and assigned to the newly created participant.

Other types of functionality may also be supported by the digital asset repository computer system 600. For example, shares that are issued to a participant may be revoked (e.g., by the issuing company) or destroyed by the operator of the digital asset repository computer system 600. In the case of revocation, a new blockchain transaction may be created that sends the revoked shares from the digital wallet of the participant to the digital wallet of the company. In the case of destruction of the shares (e.g., the company is disbanded, etc. . . . ), the operator of the digital asset repository computer system 600 may create a blockchain transaction that indicates the shares of have been destroyed. In certain examples, the digital asset repository computer system 600 may delete (or mark as deleted) the asset type from asset storage 604. This action would effectively render the data that is included as part of the various blockchain transactions irrelevant or meaningless.

It will be appreciated that such actions are may possible because digital asset repository computer system 600 controls the various private keys for each of the participants that are associated with unspent outputs on the blockchain 618. Thus, the digital asset repository computer system 600 may issue new transactions that moves such outputs to blockchain addresses that would effectively remove the asset from the "market."

In certain examples, the digital asset repository computer system 600 may change the class of share that is associated with a transactions. In certain examples, this may include updating the type in the asset storage or creating a new share class. In accordance with this change, a participant that previously owned the type of "old" class may have their shares canceled (e.g., moved from their digital wallet to the digital wallet of the company) and also have new shares in the "new" class concurrently issued (from the digital wallet of the company to the digital wallet of the participant). In other examples, a new asset may be created as described above (e.g., with the new share class) and two transactions may be formed. The first may revoke the old share class and the second may issue the new share class. The information associated with such blockchain transactions may then be recorded in ledger storage 606.

In certain examples, an asset transaction may be corrected by the digital asset repository computer system 600. In certain instances, this may involve creating another blockchain transaction that effectively cancels out the previously submitted blockchain transaction. In certain examples, the metadata that is stored in the ledger storage may be updated independently of the blockchain transaction that is associated with it. For example, the SEC rule 144 date may be a data field that only exists in ledger storage. Thus, the rule 144 date may be updated without reference to the corresponding blockchain transaction. Other fields in ledger or asset storage may be similarly updated. In certain example embodiments, a hash of the information that is not stored as part of the blockchain transaction may be incorporated into the blockchain transaction. For example, each of the extra fields may be concatenated and then hashed. The resulting hash value may be added to the blockchain transaction. This additional verification may prevent changing data fields that are not directly incorporated into the blockchain.

FIG. 5

FIG. 5 is a non-limiting example function block diagram of a centralized computer system (e.g., centralized because one entity controls the computer and the operations that are programmed into the computer) that interfaces with a blockchain according to certain example embodiments. In certain example embodiments, a centralized computer system 1000 electronically stores (e.g., in a database as part of an electronic storage system) an electronic version 1002 of a contract such as, for example, a stock purchase agreement (SPA) or a stock transfer agreement (STA). In certain example embodiments, the digital asset repository computer system 600 includes the centralized computer system 100. The created contract may specify a pending allocation of shares, a class of shares, certain types of investor (or a particular investor), etc. . . . that are eligible to act against the contract (e.g., to acquire the shares). In certain examples other electronic documents are associated and linked to the allocation contract (e.g., that define voting rights, a transfer agreement, and the like).

An electronic document may have a required number of signatures or signature blocks that must be fulfilled for the document to be considered executed. In the example shown in FIG. 5, electronic contract 1002 requires 4 different signatures. As shown in FIG. 5, computers associated with entities 1, 2, 3, and 4 communicate (e.g., via electronic data messages) with centralized computer system 1000 to provide electronic signatures that are applied to electronic contract 1002. In certain example embodiments, the signatures may be a true electronic signature (e.g., which can be thought of as a contract where an individual agrees their signature is represented by clicking a button, or the like, via a computer), a photo copy of a traditional signature, or a cryptographic digital signature.

In certain example embodiments, the created contract is hosted by and stored by, for example, centralized computer system 1000 and may be accessed and viewed by participants or entities that may be party to the contract. Such access may be provided by way of a web site or other technique for allowing entities to remotely access, view, and interact with (e.g., sign) the contract at issue. Such access may be provided via desktop computers or mobile computing devices (e.g. a smartphone, tablet, laptop, etc. . . . )

Upon signature of the contract by the entities (e.g., by one, or more, or all of entities 1-4) an electronic version of the document may be created (e.g., as a PDF) and saved with the provided signatures. In certain example embodiments, in addition to applying signatures to the electronically stored document, the central computer system 1000 may add a verification logo or other sign that indicates that the contract (e.g., upon reception of all required signatures) has been validated and/or verified by the centralized computer system 1000 (or the legal entity that controls the computer system). In certain example embodiments, the verification may include a cryptographic signature (e.g. a digital signature) indicating the entity that has verified and/or authenticated the nature of the document (e.g., that it has been properly executed by the required parties).

In certain example embodiments, upon execution of a document or contract (e.g., where all entities that are required to sign have, in fact, signed the document), a transfer of funds process may be started. The funds transfer process may be provided and initiated from the centralized computer system 1000. In certain examples, the web site that displays the contract information (e.g., through which the parties submit their signatures) also provides an interface to trigger a payment process. In certain example embodiments, this payment process is only available (e.g., visible or triggerable) through the website upon a determination (e.g., by the centralized computer system) that all required parties have signed document 1002. The contract may be, for example, a contract to provide a certain number of shares to a given individual in return for a certain amount of money.

In certain example embodiments, a payment process may be facilitated by a third party transfer agent that enables the transfer of money between two different entities. As described herein and unless otherwise specified, the transfer agent generally refers to a computer system that is operated on behalf of the transfer agent. In other words, unless otherwise specified, the transfer agent is a computer system that is appropriately programmed (e.g., via application programming interfaces or software services) that allows other computers to request the transfer of funds from one account to at least one other computer account.

In the example in FIG. 5, entities 3 and 4 are the two entities for which funds will be exchanged (e.g., entity 3 is issuing private equity shares which are being purchased for a certain amount by entity 4) In this example, entities 3 and 4 may have previously setup accounts with transfer agent 1004 (e.g., similar to how a bank account may operate to indicate where the money will be withdrawn from and where it will be deposited to).

In certain example embodiments, the entities may provide their account information to the centralized computer system 1000 that then interfaces (e.g., via a web service or other application interface provided on the transfer agent) with the transfer agent upon execution of the contract to thereby trigger the payment process action. The account information provided to the centralized computer system 1000 is transmitted to the transfer agent that they performs the requested transaction. For example, centralized computer system 1000 communicates with transfer agent (e.g., over network 1001 and via appropriately programmed software services) to trigger a transfer of funds from the account associated with entity 4 with transfer agent 1004 to the account of entity 3 that is associated with the transfer agent. As a result of a successful funds transfer, transfer agent 1004 may generate a secure API token that is passed back to the centralized computer system 1000. The token may represent a receipt of sorts that the transfer of funds has been successful. In certain example embodiments the token is a hash or one or more characteristics of the transfer that occurred.

Alternatively, or in addition and as explained in greater detail below, the funds transfer process may occur entirely within the centralized computer system (and blockchain 1006 to which it interfaces) instead of relying or using a third party for transferring the funds associated with the electronically stored contract.

Upon reception of a response (e.g., the token) from the transfer agent that indicates the transfer of funds has been successfully initiated, the centralized computer system then triggers a process to create a permanent record on the blockchain for the electronically executed contract (e.g., which may be allocation of private equity stock).

The permanent record is stored as a transaction on the blockchain. The blockchain transaction that is created may include the following information regarding the transaction between the issuer and investor entities: 1) The legal names and address of the issuer and investor (and perhaps any other person who signed the electronic document, 2) the number of shares associated with the transaction, 3) the price of each share (or the total price of the transaction), 4) the class of shares that were issued or transferred, 5) the date of the execution (e.g., when the electronic document was executed), 6) the 144 date for the transaction, 7) hashed values of all of the documents associated with this transaction (e.g., there could be more than one document that is signed per issuance, 8) data or hashes for every signature that was executed (e.g. the contract name, the signer, timestamp, and additional metadata associated with the electronic signature), 9) data associated with the funds transfer (e.g., account information, the token associated with the transaction, the timestamp, a transaction ID for the funds transfer procedure, or the like). This and other information may be included as part of a formed blockchain transaction that is submitted to the blockchain for verification and incorporation therein.

It will be appreciated that the nature of the information included as part of the blockchain may be based on specific application needs. For example, regulatory or contract needs may require the specification of certain data fields, while others are excluded. In certain examples, the information contained in the blockchain may include a token or unique identifier that acts to point to an internal database maintained by the centralized computer system 1000 (e.g., as described above in connection with FIGS. 1-4). As the information regarding the transactions are part of a publically available distributed ledger of the blockchain, independent parties (e.g., auditors, regulatory agencies) can verify and see the nature of the transaction that has occurred.

It will be appreciated that, the conventional processes for how such contracts and their execution were handled in the past could be error prone and/or time consuming. The computer system and automated processes (e.g., software programs) described herein brings many separate processes that were separately handled as part of an ad hoc process under the control of a single computer system (e.g., controlled by one entity) that provides a more centralized and predicable control for the execution and recordation of a contract (such as the allocation or transfer of private equity instruments). For example, the transfer of funds between two parties may only be allowed once the contract has been signed by all required parties. This verification is programmatically enforced by the centralized computer system 1000 based on reception of, for example, the provided secure token and/or account information. This information, along with the particulars of the executed contract, is included (expressly or via a reference token that references an internally provided database) in a blockchain transaction generated, submitted, and then verified by the distributed system that makes up the blockchain. In short, all information that is required for the transaction (e.g., an allocation or issuance of a private equity) may be included as part of the blockchain transaction. This aspect may be facilitated, as least in part, by the centralized computer system 1000 being involved in every aspect of the transaction (e.g., from creation of the contract, to execution, to fulfillment of terms of the contract, to recordation and storage of the contract, etc. . . . ).

An implementation that stores all of this information in a repository (e.g., the blockchain) is advantageous because, for example, an auditor may reference this information without having to hunt down information at different locations (e.g., by visiting different law firms, companies, or individuals). In certain examples, a subset of the information associated with a transaction may be stored on the blockchain and the superset may be stored in a database of the centralized computer system 1000. These two information data sets may be linked through the use of a token or other key (e.g., a pointer) stored in the blockchain transaction and provides a reference back to the internally maintained data-based. In such instances, an auditor (or other individual) may still find this implementation advantageous as the required data is contained on the blockchain and/or the central computing system.

In certain example embodiments, a smart contract may be integrated (e.g., entirely) into the blockchain system. In this type of implementation, the "contract" may be tied to a blockchain address that is capable of receiving and holding assets. The assets (e.g., digital tokens, shares, digital currency) may be released or transferred upon satisfaction of specific conditions defined by the contract. In other words, it is an autonomous, programmatic construct that may function like an escrow agent.
FIG. 6

FIG. 6 is signaling diagram for an example (e.g., atomic) blockchain transaction performed between an issuer identifier on the blockchain, a contract address on the blockchain, and an investor address on the blockchain. Here, three different blockchain entities (e.g., different blockchain addresses as discussed herein) are used for executing a smart contract. Blockchain issuer 1102 may be associated with a company that is issuing private equity shares or the like. Blockchain investor 1106 may be a person who is looking to invest in the company. And blockchain contract 1104 is, as discussed above, an autonomous agent that holds the shares that are being distributed by the company until satisfaction of certain defined programmatic conditions.

In step 1110, the blockchain issuer creates a share transfer agreement (STA) and allocates shares to a blockchain address associated with the contract (i.e., blockchain contract 1104) in step 1112. The contract includes a programmatic script that must be satisfied in order for the shares assigned to the blockchain contract address 1104 to be released (e.g., to the investor). The contract may include all of the shares, prices, terms, etc. associated with owning the shares. An example contract is shown in FIG. 7H. Once the shares are allocated to blockchain contract 1104 (e.g., 1 in the case of FIG. 7H), the shares are available and may not be removed without satisfying the programmatic terms of the SPA. In certain examples, there may be additional clauses or options that allow blockchain issuer 1102 to cancel the contract (e.g., prior to execution by blockchain investor 1106). For example, the contract (e.g. the offer for shares to purchase) may be automatically canceled after 7 days.

It will be appreciated that the issuance of the contract in step 1112, is more than just recording the nature of the contract, but rather represents legal intent with the committed assets (e.g., the offered shares). In other words, if the conditions of the blockchain transaction are satisfied, the assets are legally transferred upon execution of the blockchain transaction associated with the asset. Accordingly, the blockchain contract address 1104 may be similar in function to escrow.

Once the contract and shares are associated with blockchain contract 1104, the investor associated with blockchain investor may review the terms of the contract at step 114 (e.g., such as through a web page or the like as shown in FIG. 7H). In certain examples, the terms of the contract (e.g., the payment of digital or other currency to the blockchain issuer 1102 address) must be satisfied for blockchain contract 1104 to release the shares to blockchain investor 1106. Here, the terms of the contract may be embodied in a programmatic script that is associated with the blockchain transaction that is holding the shares to be purchased. Only upon satisfaction of the terms of the script (or more precisely the terms set forth in the programmatic script) will the shares be transferred to another blockchain address.

After reviewing the terms of the STA in step 1114, if the investor is still interested he may create a blockchain transaction to accept the transaction or allocation. For this process, the investor creates a blockchain transaction that includes inputs of (1) digital currency (this may be a token for real currency as well) from blockchain Investor 1106 and (2) shares in the contract from blockchain contract 1104; and outputs of (1) currency (this may be a token for real currency as well) to blockchain issuer 1102 in 1116 and (2) shares to blockchain investor 1106 in 1118. This blockchain transaction (two inputs and two outputs) is a single atomic transaction 1115 submitted to the blockchain for verification thereby.

The transfer is validated (e.g., programmatically) against the validation logic associated with the contract (e.g., a script that is associated with the transaction). In certain examples, blockchain contract 1104 may require digitally co-signing the transaction to release the shares and may only do so if the right conditions are met (e.g., if the amount of currency provided by the investor equals the value of the shares to be acquired). For example, the validation may include validating that there is a sufficient amount of digital currency to authorize the transfer of the requested number of shares. The nature of the validation of the blockchain transaction submitted from the investor is determined by the programmatic logic that is part of the allocated contract. This validation is, essentially, "controlled" by the autonomous blockchain contract address (e.g., via the scripted rules associated with the contract). In certain examples, the validation may be performed by having an escrow party also digitally sign the transaction to indicate that the required amount of funds has been deposited and is ready to be transferred to the issuer.

The flexibility of this approach may mean that different types of information may be needed for validating or satisfying the contract terms (e.g., beyond merely sending sufficient funds). For example, a hashed value of the electronic contract may be created and submitted to the blockchain contract address. Part of the scripted logic may be to check if a hashed value received from the investor matches the hashed valued that was originally used from the issuer. In other words, the input from the blockchain investor 1106 may include a hash of the document of the contract (e.g., to represent that the investor has read and understood the contract terms) that is checked against a hash of the contract that was used by the issuer. Accordingly, different types of rules (e.g., logic) may be part of the "contract" for automating the execution of the contract.

In step 1120 the contract is marked as executed and a certificate (e.g., for the newly obtained shares) is created for the investor in step 1122. An example certificate and the information that may displayed to a user concerning the same is shown in FIGS. 7G and 7H.

The approach described in FIG. 6 may make all the relevant information available on the blockchain by default, as both the blockchain contract address and the participants are entities on the blockchain network. Accordingly, there are no steps that occur out of blockchain.
FIG. 8

FIG. 8 is a block diagram of an exemplary computing system 800 according to certain example embodiments (e.g., a digital asset repository computer system as described in FIGS. 1-6, a user device as shown in FIG. 1, 2B, 3A, or 4, a computing node that is part of a distributed computing system used to process and maintain a blockchain, one computing system out of multiple computing systems that make up a computer system—such as the digital asset repository computer system as described herein, etc. . . . ). Computing system 1300 includes a processing system 1302 with CPU 1, CPU 2, CPU 3, CPU 4, a system bus 1304 that communicates with RAM 1306, and storage 1308. The storage 1308 can be magnetic, flash based (e.g., for a mobile client device), solid state, or other storage technology. The system bus 1304 communicates with user input adapter 1310 (e.g., PS/2, USB interface, or the like) that allows users in input commands to computing system 1300 via a user input device 1312 (e.g., a keyboard, mouse, touch panel, or the like). The results of the processing may be displayed to a user on a display 1316 (e.g., an LCD) via display interface 1314 (e.g., a video card or the like).

The computing system 1300 may also include a network interface 1318 (e.g., a transceiver) to facilitate wired (e.g., Ethernet—802.3x) and/or wireless communication (WiFi/802.11x protocols, cellular technology, and the like) with external systems 1322, databases 1320, and other systems via network 1324. External systems 1322 may include other processing systems, systems that provide third party services, computing nodes such as miners for the blockchain, etc. External systems 1322 may be client devices or server systems.

External systems 1322 may also include network attached storage (NAS) to hold large amounts of data. External systems, along with the internal storage and memory, may form a storage system for storing and maintaining information (e.g., blockchain information, asset information, order book information, routing strategies, etc. . . . ). Such a system may communicate with users and/or other computing systems that process electronic order data messages. The database 1320 may include relational, object orientated, or other types of databases for storing information (e.g., supplementary data that is associated with a blockchain transaction or a digital asset or resource that is represented on the blockchain, order book information for a financial instrument).

The computer system may be arranged, in various embodiments, in many different ways. As just one example, the computing system may be arranged such that processors include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip or a "system-on-chip"). As another example, the computing system may be arranged such that: the processors include two, three, four, five, or more multi-core processors; the network interface devices include a first network interface device that implements Ethernet and a second network interface device that implements WiFi and/or Bluetooth; and the memory devices include a RAM and a flash memory or hard disk.

In other words, the processes, techniques, and the like, described herein (for client devices, server, exchange, and/or controller systems) may be implemented on a computing system. Such implementations may then configure or program the processing system to carry out aspects according to certain example embodiments. It will be appreciated that other architecture types may be used. For example, a single CPU may be used instead of multiple CPUS. Alternatively, a processing system may include multiple CPU "cores." Further, the various elements shown in connection with FIG. 8 may be included into one cohesive physical structure (e.g., such as a tablet device). The components and functionality shown in FIGS. 1-7H may be implemented on or in conjunction with the example computing system shown in FIG. 8 (e.g., to thereby create a specific purpose computing machine or a new use of an existing machine).

As described herein when a software module or software process performs any action, the action is in actuality performed by underlying hardware elements according to the instructions that comprise the software module. In various embodiments, computing system 600, user devices 614A and 614B, blockchain 618, centralized computer system 1000, blockchain 1006, storage 602, 604, and 606, blockchain services 616, user interface 612, micro-services API 610, etc. . . . , each of which will be referred to individually for clarity as a "component" for the remainder of this paragraph, are implemented using an example of the computing system 1300 of FIG. 8. In such embodiments, the following applies for each component: (a) the elements of the 1300 computing system 1300 shown in FIG. 8 (i.e., the one or more processors 1302, one or more memory devices 1306 or 1308, one or more network interface devices 1318, one or more display interfaces 1314, and one or more user input adapters 1310), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 1306 and/or

1308 (e.g., in various embodiments, in a volatile memory device such as a RAM, in an instruction register, and/or in a non-volatile memory device such as a flash memory or hard disk) and all actions described herein as performed by the software modules are performed by the processors 1302 in conjunction with, as appropriate, the other elements in and/or connected to the computing system 1300 (i.e., the network interface devices 1318, display interfaces 1314, user input adapters 1310, and/or display device 1316); (c) alternatively or additionally, to the extent it is described herein that the component processes and/or otherwise handles data, in some embodiments, such data is stored in the memory devices (e.g., in some embodiments, in a volatile memory device such as a RAM and/or in a non-volatile memory device such as a flash memory or hard disk) and/or is processed/handled by the processors 1302 in conjunction, as appropriate, the other elements in and/or connected to the computing system 1300 (e.g., the network interface devices 1318, display interfaces 1308, user input adapters 1310, and/or display device 1316); (d) alternatively or additionally, in some embodiments, memory devices store instructions that, when executed by the processors 1302, cause the processors 1302 to perform, in conjunction with, as appropriate, the other elements in and/or connected to the computing system 1300, each or any combination of actions described herein as performed by the component and/or by any software modules described herein as included within the component.

Technical Advantages of Described Subject Matter

In certain example embodiments, provenance and chain of custody information is provided via the blockchain and blockchain transactions are individually associated with corresponding records that are stored in a separate computer system. The provenance and chain-of-custody information is secured through the use of the cryptographically verifiable operations that form the blockchain.

In certain example embodiments, a user interface (e.g., via a web site or the like) is provided and allows participants to view transactions that are associated with a particular asset or resource. This allows participants to visualize the provenance and chain of custody information.

In certain example embodiments, data transaction requests may be submitted to the computer system. The data transaction requests may be associated with creating or issuing an asset, allocation of an asset to different participants, requests to perform an electronic auction process, requests to perform a transaction and/or settle with a third party agent.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 1-6, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

For each embodiment described herein where blockchain technology is used for a particular purpose or feature, it should be understood that blockchain technology is just one example of a technology that may be used for such purpose/feature; in various other embodiments, other types of distributed ledger technology, distributed database technology, and/or smart contracts technology may be used in place of and/or in conjunction with blockchain technology for such purpose/feature.

Although various embodiments have been shown and described in detail, the claims are not limited to any particular embodiment or example. None of the above description should be read as implying that any particular element, step, range, or function is essential. All structural and functional equivalents to the elements of the above-described preferred embodiment that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, component, or step in this specification is intended to be dedicated to the public.

The invention claimed is:

1. A computer system comprising:
    non-transitory computer readable storage configured to store:
        blockchain participant identifiers that are each associated with at least one cryptographic key and a corresponding one of plural different participants, and
        a plurality of blockchain resource identifiers that are associated with at least one resource cryptographic key;
    at least one hardware processor coupled to the non-transitory computer readable storage that stores computer executable instructions that, when executed by the at least one hardware processor, cause the at least one hardware processor to perform operations comprising:
        based on a digital resource issuance request, generating a programmatic script that is associated with a digital resource identifier for a resource, wherein the programmatic script is associated with a corresponding cryptographic key and a blockchain address of a blockchain, which is provided by a distributed blockchain computing system, wherein the programmatic script is associated with a total quantity that has been issued for the digital resource issuance request;
        generating a hash of additional data;
        generating a blockchain transaction that is to be sent to the blockchain address associated with the digital resource, the generated blockchain transaction including (1) a quantity value for how much of the digital resource is specified within the blockchain transaction and (2) the hash of the additional data;
        signing the generated blockchain transaction with a corresponding cryptographic key that is associated with a sending blockchain address;
        sending the blockchain transaction to the blockchain address that is associated with the digital resource;
        validating, based on execution of the programmatic script that is associated with a digital resource identifier for the resource and part of the blockchain, that at least the quantity value included in the generated blockchain transaction is a valid quantity;
        based on the validating, incorporating the signed generated blockchain transaction into the blockchain;
        storing, to the non-transitory computer readable storage, a transaction record that includes the additional data that was not included in the generated blockchain transaction;
        determining that the generated blockchain transaction incorporated into the blockchain; and
        updating, based on determination that the generated blockchain transaction has been validated, the transaction record that is stored in the non-transitory computer readable storage.

2. The computer system of claim 1, wherein the operations further comprise: comparing the hash of the additional data that is included in the generated blockchain transaction to a hash that is calculated as part of the programmatic script.

3. The computer system of claim 1, wherein the operations further comprise:
    obtaining a total quantity of the digital resource that is associated with a given participant identifier.

4. The computer system of claim 1, wherein the operations further comprise:
    based on failure of the validation, aborting the generated blockchain transaction and generating a notification message for the failure.

5. The computer system of claim 1, wherein the operations further comprise:
    beginning a first process, during which participants submit data transaction requests to send or receive amounts of the resource that is associated with the digital resource identifier;
    closing the first process to reception of data transaction requests from the participants;
    generating a single blockchain transaction that includes inputs that correspond to source participant blockchain identifiers and outputs that correspond to destination participant blockchain identifiers, wherein the inputs are based on at least some of the data transactions requests to send amounts of the resource and the outputs are based on at least some of the data transactions requests to receive amounts of the resource; and
    submitting the single blockchain transaction to the distributed blockchain computing system.

6. The computer system of claim 5, wherein the outputs are directed to source participant blockchain identifiers for unspent amounts of the resource.

7. The computer system of claim 1, wherein the operations further comprise:
    obtaining data for at least one recorded blockchain transaction; and
    generating a display that includes a plurality of participants that are each associated with at least one of a plurality of different participant blockchain identifiers,
    wherein the generated display includes quantity values for inputs of the least one recorded blockchain transaction,
    wherein the generated display includes quantity values for outputs of the least one recorded blockchain transaction.

8. The computer system of claim 7, wherein multiple different digital resource issuance requests are used to created different types of the resource,
    wherein multiple different blockchain transactions that are recorded to the blockchain are each associated with one of the created different types of the resource,
    wherein each input and output for each of the multiple different blockchain transactions is displayed to indicate which one of the one of the created different types of the resource that the corresponding blockchain transaction for the input and outputs is associated with.

9. The computer system of claim 1, wherein the additional data includes at least one of an allocation data, a price value, and/or an investment value.

10. The computer system of claim 1, wherein the additional data includes providence data.

11. The computer system of claim 1, wherein the generated blockchain transaction is also signed by at least two different cryptographic keys.

12. The computer system of claim 1, wherein the operations further comprise:
    receiving a resource allocation request for allocation of at least a portion of an unspent output of the generated blockchain transaction; and generating a second blockchain transaction that includes data from the output of the generated blockchain transaction as an input for the second blockchain transaction;

submitting the second generated blockchain transaction to the distributed blockchain computing system for incorporation into the blockchain that is maintained by the distributed blockchain computing system; and in correspondence with submission of the second generated blockchain transaction, storing, to the non-transitory computer readable storage, a second transaction record that includes at least some of the data included in the second generated blockchain transaction and additional transaction data that was not included in the second generated blockchain transaction.

13. The computer system of claim 1, further comprising:

at least one computing node of the distributed blockchain computing system, wherein multiple different nodes of the distributed blockchain computing system are maintained by different organizations.

14. A method implemented on a computer system, the method comprising:

communicating with one or more computing nodes of a distributed blockchain computing system that maintains a blockchain;

retrieving blockchain participant identifiers that are each associated with at least one cryptographic key and a corresponding one of plural different participants, receiving a resource issuance request for issuance of a resource;

based on a digital resource issuance request, generating a programmatic script that is associated with a digital resource identifier for a resource, wherein the programmatic script is associated with a corresponding cryptographic key and a blockchain address of a blockchain, which is provided by a distributed blockchain computing system, wherein the programmatic script is associated with a total quantity that has been issued for the digital resource issuance request;

generating a hash of additional data;

generating a blockchain transaction that is to be sent to the blockchain address associated with the digital resource, the generated blockchain transaction including (1) a quantity value for how much of the digital resource is specified within the blockchain transaction and (2) the hash of the additional data;

signing the generated blockchain transaction with a corresponding cryptographic key that is associated with a sending blockchain address;

sending the blockchain transaction to the blockchain address that is associated with the digital resource;

validating, based on execution of the programmatic script that is associated with a digital resource identifier for the resource and part of the blockchain, that at least the quantity value included in the generated blockchain transaction is a valid quantity;

based on the validating, incorporating the signed generated blockchain transaction into the blockchain;

storing, to a non-transitory computer readable storage, a transaction record that includes the additional data that was not included in the generated blockchain transaction;

determining that the generated blockchain transaction incorporated into the blockchain; and updating, based on determination that the generated blockchain transaction has been validated, the transaction record that is stored in the non-transitory computer readable storage.

15. The method of claim 14, further comprising:

beginning a first process, during which participants submit data transaction requests to send or receive amounts of the resource that is associated with the digital resource identifier;

closing the first process to reception of data transaction requests from the participants;

generating a single blockchain transaction that includes inputs that correspond to source participant identifiers and outputs that correspond to destination participant identifiers, wherein the inputs are based on at some of the data transactions requests that intend to send amounts of the resource and the outputs are based on some of the data transactions requests that intend to receive amounts of the resource; and submitting the single blockchain transaction to the distributed blockchain computing system.

16. The method of claim 15, wherein the single blockchain transaction is cryptographically linked, directly or indirectly, to the blockchain transaction.

17. The method of claim 14, further comprising:

receiving a resource allocation request that identifies at least a second participant that will be allocated an unspent output of the generated blockchain transaction; and generating a second blockchain transaction that includes data from the output of the generated blockchain transaction as an input for the second blockchain transaction;

submitting the second generated blockchain transaction to the distributed blockchain computing system; and in correspondence with submitting the second generated blockchain transaction to the distributed blockchain computing system, storing, to the non-transitory computer readable storage, a second transaction record that includes at least some of the data included in the second generated blockchain transaction and additional transaction data that was not included in the second generated blockchain transaction.

18. The method of claim 14, further comprising:

retrieving data for at least one recorded blockchain transaction; and generating data for a display that includes a plurality of participants that are each associated with at least one of a plurality of different participant blockchain identifiers, wherein the generated display includes quantity values for inputs of the least one recorded blockchain transaction, wherein the generated display includes quantity values for outputs of the least one recorded blockchain transaction.

19. The method of claim 18, wherein multiple different digital resource issuance requests are used to created different types of the resource, wherein multiple different blockchain transactions that are recorded to the blockchain are each associated with one of the created different types of the resource, wherein each input and output for each of the multiple different blockchain transactions is displayed to indicate which one of the one of the created different types of the resource that the corresponding blockchain transaction for the input and outputs is associated with.

20. A non-transitory computer readable storage medium having stored thereon computer readable instructions for use with a computer system that includes at least one processor, a memory, and a transceiver, the stored computer readable instructions comprising instructions that, when executed by the at least one processor, cause the computer system to perform operations comprising:

communicating with one or more computing nodes of a distributed blockchain computing system that maintains a blockchain;

retrieving blockchain participant identifiers that are each associated with at least one cryptographic key and a corresponding one of plural different participants, receiving a resource issuance request for issuance of a resource;

based on a digital resource issuance request, generating a programmatic script that is associated with a digital resource identifier for a resource, wherein the programmatic script is associated with a corresponding cryptographic key and a blockchain address of a blockchain, which is provided by a distributed blockchain computing system, wherein the programmatic script is associated with a total quantity that has been issued for the digital resource issuance request;

generating a hash of additional data;

generating a blockchain transaction that is to be sent to the blockchain address associated with the digital resource, the generated blockchain transaction including (1) a quantity value for how much of the digital resource is specified within the blockchain transaction and (2) the hash of the additional data;

signing the generated blockchain transaction with a corresponding cryptographic key that is associated with a sending blockchain address;

sending the blockchain transaction to the blockchain address that is associated with the digital resource;

validating, based on execution of the programmatic script that is associated with a digital resource identifier for the resource and part of the blockchain, that at least the quantity value included in the generated blockchain transaction is a valid quantity;

based on the validating, incorporating the signed generated blockchain transaction into the blockchain;

storing, to the non-transitory computer readable storage, a transaction record that includes the additional data that was not included in the generated blockchain transaction;

determining that the generated blockchain transaction incorporated into the blockchain; and updating, based on determination that the generated blockchain transaction has been validated, the transaction record that is stored in the non-transitory computer readable storage.

\* \* \* \* \*